US 6,546,811 B2

United States Patent
Fincke

(10) Patent No.: US 6,546,811 B2
(45) Date of Patent: *Apr. 15, 2003

(54) MULTIPHASE FLOW CALCULATION SOFTWARE

(75) Inventor: James R. Fincke, Idaho Falls, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/814,298

(22) Filed: Mar. 21, 2001

(65) Prior Publication Data

US 2002/0069022 A1 Jun. 6, 2002

Related U.S. Application Data

(63) Continuation-in-part of application No. 09/400,946, filed on Sep. 22, 1999, which is a continuation-in-part of application No. 08/937,120, filed on Sep. 24, 1997, now abandoned.

(51) Int. Cl.[7] ............................................. G01F 1/44
(52) U.S. Cl. .............................................. 73/861.63
(58) Field of Search ............................. 73/861.04, 194, 73/861.52, 61.47, 19.1, 861.63; 702/45, 50, 66, 47; 181/139

(56) References Cited

U.S. PATENT DOCUMENTS 6,332,111 B1 * 12/2001 Fincke ........................ 702/45

* cited by examiner

Primary Examiner—Hezron Williams
Assistant Examiner—Jewel V. Thompson
(74) Attorney, Agent, or Firm—Workman Nydegger & Seeley

(57) ABSTRACT

Multiphase flow calculation software and computer-readable media carrying computer executable instructions for calculating liquid and gas phase mass flow rates of high void fraction multiphase flows. The multiphase flow calculation software employs various given, or experimentally determined, parameters in conjunction with a plurality of pressure differentials of a multiphase flow, preferably supplied by a differential pressure flowmeter or the like, to determine liquid and gas phase mass flow rates of the high void fraction multiphase flows. Embodiments of the multiphase flow calculation software are suitable for use in a variety of applications, including real-time management and control of an object system.

51 Claims, 6 Drawing Sheets

MULTIPHASE FLOW CALCULATION SOFTWARE

RELATED APPLICATION

This application is a continuation-in-part U.S. patent application Ser. No. 09/400,946, filed Sep. 22, 1999, which is a continuation-in-part of U.S. patent application Ser. No. 08/937,120, filed Sep. 24, 1997, now abandoned, and incorporated herein by reference.

CONTRACTUAL ORIGIN OF THE INVENTION

This invention was made with United States Government support under Contract No. DE-AC07-94ID13223, now Contract No. DE-AC07-99ID13727 awarded by the United States Department of Energy. The United States Government has certain rights in the invention.

FIELD OF THE INVENTION

The present invention relates generally to processes, methods, and computer software for calculating mass flow rates of gas and liquid phases of a multiphase flow. More particularly, the present invention relates to software which uses multiple pressure differentials to determine mass flow rates of gas and liquid phases of high void fraction multiphase flows.

PRIOR STATE OF THE ART

There are many situations where it is desirable to monitor multiphase fluid streams prior to separation. For example, in oil well or gas well management, it is important to know the relative quantities of gas and liquid in a multiphase fluid stream, to thereby enable determination of the amount of gas, etc. actually obtained. This is of critical importance in situations, such as off-shore drilling, in which it is common for the production lines of several different companies to be tied into a common distribution line to carry the fuel back to shore. In the prior art, a common method for metering a gas is to separate out the liquid phase, but a separation system in not desirable for fiscal reasons. When multiple production lines feed into a common distribution line, it is important to know the flow rates from each production line to thereby provide an accurate accounting for the production facilities.

In recent years, the metering of multiphase fluid streams prior to separation has achieved increased attention. Significant progress has been made in the metering of multiphase fluids by first homogenizing the flow in a mixer then metering the pseudo single phase fluid in a venturi in concert with a gamma densitometer or similar device. This approach relies on the successful creation of a homogenous mixture with equal phase velocities, which behaves as if it were a single phase fluid with mixture density:

$$\bar{\rho} = \alpha \rho_g + (1-\alpha) \rho_l$$

where $\alpha$ is the volume fraction of the gas phase, $\rho_g$ is the gas phase density and $\rho_l$ is the liquid phase density. This technique works well for flows which after homogenizing the continuous phase is a liquid phase. While the upper limit of applicability of this approach is ill defined, it is generally agreed that for void fractions greater than about ninety to ninety-five percent (90–95%) a homogenous mixture is very difficult to create or sustain.

The characteristic unhomogenized flow in this void fraction range is that of an annular or ring-shaped flow configuration. The gas phase flows in the center of the channel and the liquid phase adheres to and travels along the sidewall of the conduit as a thick film. Depending on the relative flow rates of each phase, significant amounts of the denser liquid phase may also become entrained in the gas phase and be conveyed as dispersed droplets. Nonetheless, a liquid film is always present on the wall of the conduit. While the liquid generally occupies less than five percent (5%) of the cross-sectional volume of the flow channel, the mass flow rate of the liquid phase may be comparable to or even several times greater than that of the gas phase due to its greater density.

The fact that the gas and liquid phases are partially or fully separated, and consequently have phase velocities which are significantly different (slip), is problematic where metering of the respective mass flow rates of the gas and liquid phases is concerned. In particular, the presence of the liquid phase distorts the gas phase mass flow rate measurements and causes conventional meters, such as orifice plates and venturi meters, to overestimate the mass flow rate of the gas phase. For example the gas phase mass flow rate can be estimated using the standard equation:

$$m_g = \frac{A C_c Y}{\sqrt{1-\beta^4}} \sqrt{2 \rho_g \Delta P}$$

where $m_g$ is the gas phase mass flow rate, A is the area of the throat, $\Delta P$ is the measured pressure differential, $\rho_g$ the gas phase density at flow conditions, $C_c$ the discharge coefficient, and Y is the expansion factor. In test samples having void fractions ranging from 0.997 to 0.95, the error in the measured gas phase mass flow rate ranges from about seven percent (7%) to about thirty percent (30%). It is important to note that the presence of the liquid phase increases the pressure drop in the venturi and results in over-predicting the true gas phase mass flow rate. This pressure drop is caused by the interaction between the gas and liquid phases.

In particular, liquid droplet acceleration by the gas, irreversible drag force work done by the gas phase in accelerating the liquid film, and wall losses, determine the magnitude of the observed pressure drop. In addition, the flow is complicated by the continuous entrainment of liquid into the gas phase, the redeposition of liquid from the gas phase into the liquid film along the venturi length, and also by the presence of surface waves on the surface of the annular or ringed liquid phase film. The surface waves on the liquid create a roughened surface over which the gas must flow, thereby increasing the momentum loss due to the addition of drag at the liquid/gas interface.

Other simple solutions have been proposed to solve the overestimation of gas mass flow rate under multiphase conditions. For example, Murdock ignores any interaction (momentum exchange) between the gas and liquid phases and has proposed to calculate the gas mass flow if the ratio of gas to liquid mass flow is known in advance. See Murdock, J. W. (1962), *Two Phase Flow Measurement with Orifices, ASME Journal of Basic Engineering*, December, pp. 419–433. Unfortunately this method still has up to a twenty percent (20%) error rate or higher.

Another example of a multiphase measurement device in the prior art is U.S. Pat. No. 5,461,930, (Farchi et al.), which appears to teach the use of a water cut meter and a volumetric flow meter for measuring the gas and liquid phases. This invention is complicated because it requires the use of a positive displacement device to measure the liquid and gas flow rates so it can avoid the problem of slip between the gas and liquid phases. This system does not appear to be effective for liquid fractions below about five percent to about ten percent (5%–10%). As mentioned earlier, other such prior art systems such as U.S. Pat. No. 5,400,657 (Kolpak et al.), are only effective for multiphase fluid flows where the gas fraction is twenty five percent (25%) of the volume and the liquid is seventy five percent (75%) of the volume.

Other volumetric measuring devices such as are indicated in U.S. Pat. No. 4,231,262 (Boll et al.), measure a flow of solids in a gas stream. For example, coal dust in a nitrogen stream may be measured. Although these types of devices use pressure measuring structures, they are not able to address the problem of measuring a liquid fraction in a multiphase flow where the liquid phase is less than ten percent (10%) or even five percent (5%) of the overall volume. Measuring liquid and gas phases of a multiphase flow is significantly different from measuring a gas having a solid particulate. The mass of the liquid is significant and not uniform throughout the gas. Incorrectly measuring the liquid throws off the overall measurements significantly. Furthermore, such devices, which typically have two pressure measuring points on the venturi throat, are not sensitive to the fact that a pressure drop is caused by the interaction between the gas and liquid phases and must be calculated for accordingly.

While past attempts at metering multiphase fluid streams have produced acceptable results below the ninety to ninety five percent (90–95%) void fraction range, they have not provided satisfactory metering for the very high void multiphase flows which have less than five to ten percent (5–10%) non-gas phase by volume. When discussing large amounts of natural gas or other fuel, even a few percentage points difference in the amount of non-gas phase can mean substantial differences in the value of a production facility.

For example, if there are two wells which produce equal amounts of natural gas per day. The first well produces, by volume, one percent (1%) liquid and the second well produces five percent (5%) liquid. If a conventional mass flow rate meter is relied upon to determine the amount of gas produced, the second well will erroneously appear to produce as much as twenty to thirty percent (20–30%) more gas than the first well. Suppose further that the liquid produced is a light hydrocarbon liquid (e.g., a gas condensate such as butane or propane) which is valuable in addition to the natural gas produced. Conventional meters will provide no information about the amount of liquid produced. Then, if the amount of liquid produced is equally divided between the two wells, the value of the production from the first well will be overestimated while the production from the second well will be underestimated.

To properly value the gas and liquid production from both wells, a method of more accurately determining the mass flow rate of both the gas and liquid phases is required. The prior art, however, has been incapable of accurately metering the very high void multiphase fluid streams. In light of the problems of the prior art, there is a need for methods, systems, and software that are relatively simple in design and operation and provide for increased accuracy in determining gas and liquid phase mass flow rates in multiphase fluid streams, particularly high void fraction multiphase fluid streams. Further, such methods, systems, and software should provide accurate results without requiring special treatment or manipulation, such as homogenization or separation, of the multiphase fluid. Finally, such methods, systems, and software should be reliable, simple to use, accurate, and relatively inexpensive.

BRIEF SUMMARY OF THE INVENTION

The present invention has been developed in response to the current state of the art, and in particular, in response to these and other problems and needs that have not been fully or completely resolved. Briefly summarized, embodiments of the present invention provide for program code, executable code, and the like, that employs differential pressure data to calculate the respective mass flow rates of gas and liquid phases of a multiphase flow.

Embodiments of the present invention are especially well suited for use in measuring respective mass flow rates of gas and liquid phases of high void fraction multiphase flows such as are typically encountered in oil and gas field applications. However, it will be appreciated that embodiments of the present invention may be profitably employed in any application where it is desired to accurately and reliably measure mass flow rates of gas and liquid phases of a multiphase flow.

These, and other, features and advantages of the invention are realized in multiphase flow calculation (MFC) software for determining the respective mass flow rates of gas and liquid phases of a multiple phase fluid. In one embodiment of the invention, the MFC software resides on a client computer that is, preferably, in communication with various sensors, devices systems, and the like which provide input to the client computer concerning various aspects of a multiphase flow. Other inputs provided to the MFC software comprise given values of particular parameters or constants, preferably retrievably stored in the memory of the client computer. Finally, at least some parameter values determined by the a MFC software are employed as inputs in the determination of other parameter values, to provide input to a control system, and/or to provide feedback to a system operator or manager regarding various aspects of the multiphase flow.

Examples of given inputs typically employed by embodiments of the MFC software include, but are not limited to, a reference gas density $rho_g$, preferably the density of methane at standard temperature and pressure, pressure differentials $\Delta P_2$ and $\Delta P_3$, typically provided by a differential pressure flowmeter or the like, a density $rho_l$ of the liquid phase, experimentally determined constants A, B, and C, and various inputs relating to the physical configuration of the differential pressure flowmeter. Such differential pressure flowmeter related inputs include a contraction ratio $\beta$ of the area $A_t$, of the extended throat of the differential pressure flowmeter to the entrance area $A_0$ of the differential pressure flowmeter, the temperature T of the multiphase flow at the entrance of the differential pressure flowmeter, and the pressure P of the multiphase flow at the entrance of the differential pressure flowmeter.

As suggested above, the given inputs to the MFC software originate from various sources. Typically, a differential pressure flowmeter, or the like, serves to provide pressure differentials $\Delta P_2$ and $\Delta P_3$ to the client computer by way of pressure transducers or the like. The temperature T and the pressure P of the multiphase flow at the entrance of the differential pressure flowmeter are provided by suitable temperature and pressure gauges, respectively, in communication with the client computer in which the MFC software resides. Further, given inputs such as reference gas density $rho_g$, density $rho_l$ of the liquid phase, and experimentally determined constants A, B, and C, are stored in a database or other suitable data structure resident on, or accessible by, the client computer.

In operation, the given inputs, as well as values determined by the MFC software are then used by one or more modules of the MFC software to determine various parameters of interest concerning the multiphase flow. Such parameters determined by the MFC software modules include, but are not limited to, gas phase density $rho_{gw}$, normalized gas phase mass flow rate mgm, actual gas phase mass flow rate $m_g$, gas phase velocity $u_g$, gas phase pressure drop $\Delta P_{g/3}$, liquid phase velocity $u_l$, friction f, and multiphase flow mass flow rate $m_t$. Once determined, such parameters are preferably used as inputs to other software programs, control systems such as may be used to control and adjust the performance of a gas or oil well from which the multiphase flow originates, feedback systems, or the like. Additionally, such values are preferably stored in a database for use in subsequent analyses and the like.

These and other features and advantages of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered to be limiting of its scope, the invention and its presently understood best mode for making and using the same will be described and explained with additional specificity and detail through the use of the accompanying drawings in which.

DETAILED DESCRIPTION OF INVENTION

Reference will now be made to figures wherein like structures will be provided with like reference designations. It is to be understood that the drawings are diagrammatic and It schematic representations of various embodiments of the invention, and are not to be construed as limiting the present invention.

Figure 1:
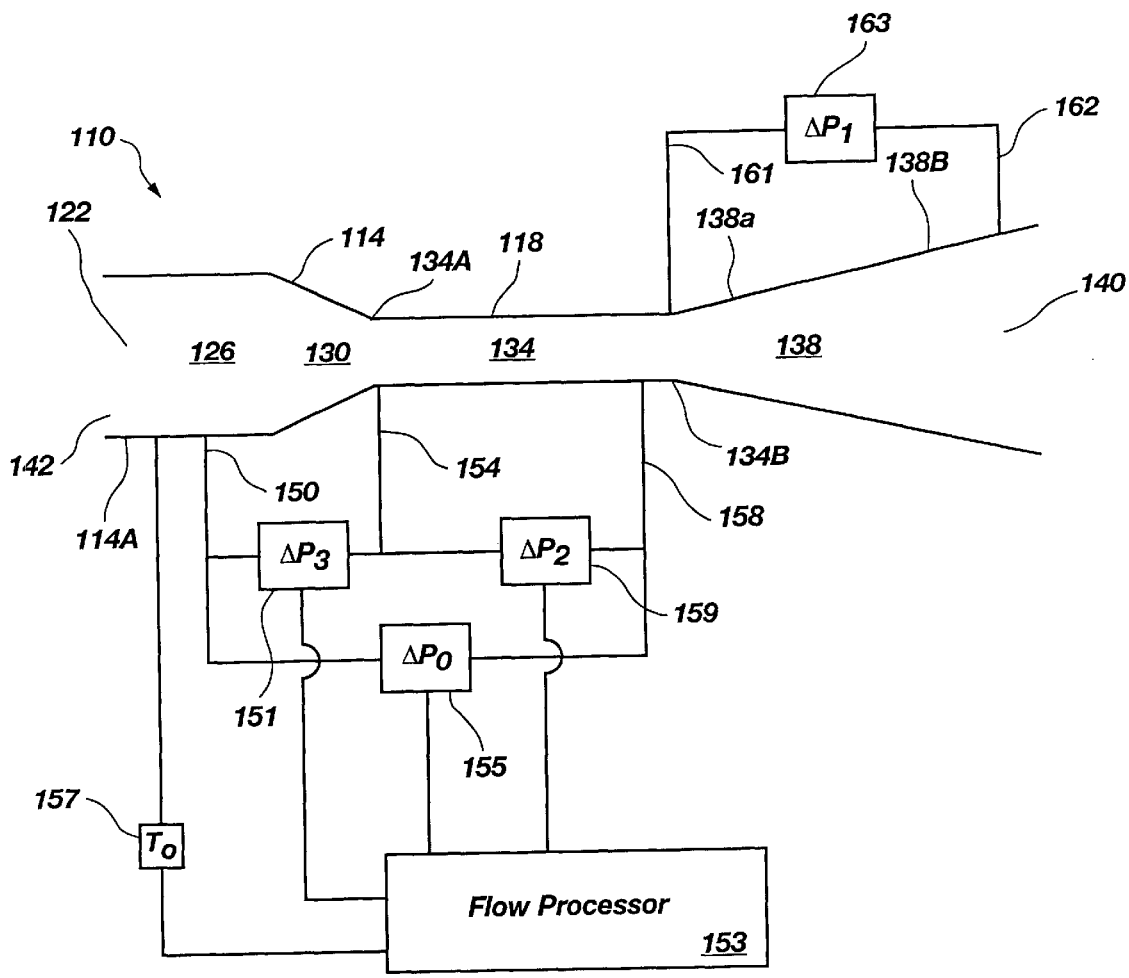
FIG. 1 is a side cross-section view of an embodiment of a differential pressure flow meter having a plurality of pressure measuring points.

Turning now to FIG. 1, an embodiment of a differential pressure flow meter is indicated generally at 110. The differential pressure flow meter 110 includes a venturi 114 formed by a sidewall 118 which defines a fluid flow passage 122. The fluid flow passage 122 is segmented into an inlet, or entrance, section 126, a converging section 130, an extended throat section 134, a diffuser section 138 and an outlet section 140.

Aspects of the geometry of differential pressure flow meter 110 may be varied depending on the particular application and variables such as specific flow rate, pressure, temperature and other factors. One important characteristic of differential pressure flow meter 110 is that the preferred contraction ratio $\beta$ in the conduit should be between 0.4 and 0.75. The contraction ratio $\beta$ is defined as the ratio of the diameter of extended throat 134 to the diameter of entrance section 126. It is also important that the length of extended throat 134 be at least ten times the diameter of extended throat 134. Of course, other throat lengths may be used.

An example of one possible set of differential pressure flow meter 110 measurements will now be given, but it should be realized that the actual geometry will depend on factors including, but not limited to, those enumerated above. In one embodiment of the invention, inlet section 126 has a diameter of about 3.8 cm adjacent opening 142 at the upstream, proximal end 114A of venturi 114. Converging section 130 tapers inwardly from inlet section 126 at an angle of about ten degrees (10°) until it connects with extended throat section 134, which has a diameter of about 2.5 cm. Extended throat section 134 remains substantially the same diameter throughout its length and may be about 30 cm long to provide ample length to determine acceleration differences between the various phases. At the end of extended throat section 134B, diffuser section 138 tapers outwardly at an angle of about three degrees (3°) until the diameter of outlet section passage 140 is substantially the same as that of inlet section 126 (i.e. 3 cm). It should be realized that many other specific geometric configurations could be defined which have characteristics similar to the example above.

In order to monitor the pressure differentials caused by the changes in fluid velocity, the embodiment of differential pressure flow meter illustrated in FIG. 1 preferably utilizes four different measurement points. Each pair of pressure measurement points defines a pressure differential. Only two pressure differential measurements are required to determine the gas and liquid flow rates. The preferred pressure differentials are $\Delta P_3$ and $\Delta P_2$. Pressure differential number three ($\Delta P_3$) is defined as the pressure change between points 150 and 154. Pressure differential number two ($\Delta P_2$) is between points 154 and 158. The pressure differential $\Delta P_2$ is important because it used for the calculation of the pressure drop experienced by the gas phase due to the work performed by the gas phase in accelerating the liquid phase.

It should also be apparent based on this disclosure that the combination of pressure differentials $\Delta P_3$ and $\Delta P_0$ or $\Delta P_2$ and $\Delta P_0$ may be used instead. Each of these combinations work equally well, with the exception that the numerical constants in the algorithm change. It is also important that an absolute pressure and temperature measurement will be provided at the venturi inlet 142.

Now the pressure ports will be described more specifically. A first pressure measuring port 150 is disposed to measure the pressure in the inlet section 142. The first pressure measuring port 150 is connected to a pressure monitoring means, such as a pressure transducer 151, to provide a pressure reading.

A second pressure measuring port 154 is provided at the entrance of the extended throat section 134. The second pressure measuring port 154 is disposed adjacent the upstream, proximal end 134a of the extended throat section 134. A pressure transducer 151 is also coupled to the second pressure measuring port 154.

Distally from the second pressure measuring port 154, but still within the extended throat section 134, is a third pressure measuring port 158. Preferably, the third pressure measuring port 158 is disposed adjacent the distal end 134B of the extended throat section 134, and adjacent the beginning 138*a* of the diffuser section 138.

The respective pressure measuring ports 150, 154, and 158 are disposed in communication with a flow processor 153 or similar mechanism through the pressure monitoring means or pressure transducers 151, 155, and 159. The flow processor 153 enables the acquisition of the measured pressure differentials, and thus fluid flow rates in accordance with the present invention. Further, an accurate determination of the relative acceleration of the two phases can also be obtained by comparing the pressure drop between the inlet section 126 (through measuring port 150) and the distal end 134B of the extended throat section 134 (through measuring port 158), as indicated at $\Delta P_0$.

In an alternative embodiment of the invention, a fourth pressure measuring port 161 is disposed at the end of the extended throat 134B. A fifth pressure measuring port 162 is disposed in the outlet section 140 adjacent to the distal end 138B of the diffuser section 138. Both of these pressure measuring ports are coupled to pressure monitoring means or pressure transducer 163. The fourth and fifth pressure measuring ports allow a pressure differential $\Delta P_1$ to be measured.

The pressure differential ($\Delta P_1$) between the extended throat section 134 and the distal end 138B of the diffuser section 138 can also be analyzed.

Figure 2:
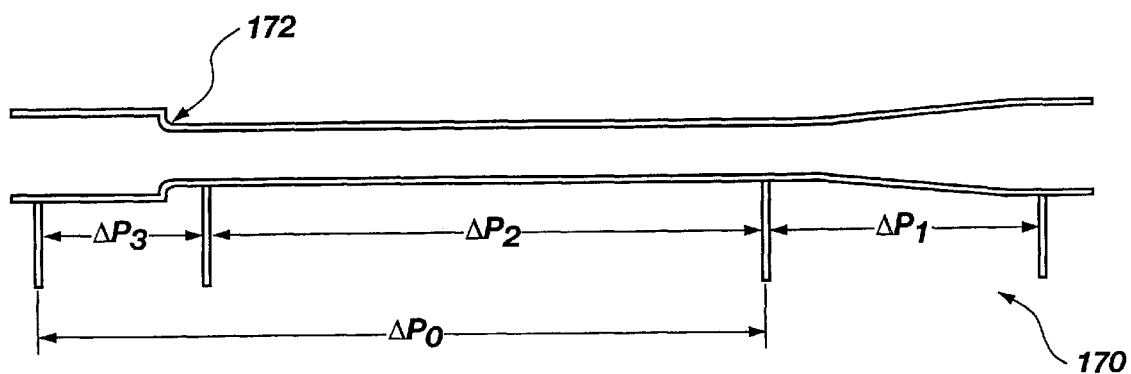
FIG. 2 is a side cross-section view of an alternative embodiment of a differential pressure flow meter.

It should also be realized that different angles and lengths can be used for the venturi constriction and the extended throat of the venturi tube. In fact, the converging section of the venturi is not required to gradually taper. In FIG. 2, a converging section 172 is shown as formed by an annular shoulder in a venturi tube 170 to reduce the cross-sectional area of the inlet section. The preferred size of the radius of curvature for an annular shoulder 172 is about 0.652 cm. The converging section can also be formed by placing a solid object in the conduit which occupies part but not all of the conduit cross-section.

It is important that the correct method be used in the current invention to estimate the gas and fluid mass flow. Otherwise errors in the range of 20% or more will be introduced into the measurements, as in the prior art. Reliable metering of high void fraction multiphase flows over a wide range of conditions (liquid loading, pressure, temperature, and gas and liquid composition) without prior knowledge of the liquid and gas mass flow rates requires a different approach than the simple modification of the single phase meter readings as done in the prior art. Conceptually, the method of metering a fluid flow described here is to impose an acceleration or pressure drop on the flow field via a structure or venturi constriction and then observe the pressure response of the device across two pressure differentials as described above. Because the multiphase pressure response differs significantly from that of a single-phase fluid, the measured pressure differentials are a unique function of the mass flow rates of each phase.

As described above, the gas and liquid phases are strongly coupled. When the gas phase accelerates in the converging section of the nozzle, the denser liquid phase velocity appreciably lags that of the lighter gas phase. In the extended throat region, the liquid phase continues to accelerate, ultimately approaching its equilibrium velocity with respect to the gas phase. Even at equilibrium, significant velocity differences or slip will exist between the gas and liquid phases. A method for accurately calculating the gas and liquid mass flows in an extended venturi tube will now be described. (A derivation of the method is shown later.) This method uses the four values which are determined though testing. These values are: $\Delta P_3$ which is the measured pressure differential across the venturi contraction, $\Delta P_2$ which is the measured pressure differential across the extended venturi throat, P which is the absolute pressure upstream from the venturi (psi), and T which is the temperature of the upstream flow. These measured values are used with a number of predefined constants which will be defined as they are used. Alternatively, the pressure differentials $\Delta P_3$ and $\Delta P_0$, or the pressure differentials $\Delta P_0$ and $\Delta P_2$ may be used.

First, the gas density for the gas flow must be calculated based on the current gas well pressure and temperature. This is done using the following equation which uses English units. Any other consistent set of units may also be used with appropriate modifications to the equations.

$$rho_{gw} = rho_g \left( \frac{P + 14.7}{14.7} \right) \left( \frac{60 + 459.67}{T + 459.67} \right) \qquad \text{Equation 1}$$

where,
$rho_g$ is the density of natural gas (i.e. a mixture of methane and other hydrocarbon and non-hydrocarbon gases) at standard temperature (60° F.) and pressure (1 atmosphere) for a specific well;

P is the pressure upstream from the venturi in pounds per square inch (psi); and T is the temperature upstream from the venturi in degrees Fahrenheit.

The value of $rho_g$ will be different for various natural gas compositions and must be supplied by the well operator. At the standard temperature (60° F.) and pressure (1 atmosphere) the value of $rho_g$ for pure methane is 0.044 lb/ft$^3$.

The second step is finding a normalized gas phase mass flow rate based on the square root of a pressure difference across the contraction multiplied by a first predetermined coefficient, and the square root of a measured pressure differential across a venturi throat. The normalized gas phase mass flow rate is found using the following equation:

$$mgm = A + B\sqrt{\Delta P_3} + C\sqrt{\Delta P_2} \qquad \text{Equation 2}$$

where,
A, B, and C are experimentally determined constants required to calculate gas mass flow rate;

$\Delta P_3$ is the measured pressure differential across a venturi contraction; and $\Delta P_2$ is the measured pressure differential across a venturi throat.

The preferred values for the constants in the equation above are as follows: A is −0.0018104, B is 0.008104 and C is −0.0026832 when pressure is in pounds per square inch (psi), density in lbs/ft$^3$ and mass flow rate in thousands of mass lbs/minute. Of course, these numbers are determined experimentally and may change depending on the geometry of the venturi, the fluids used, and the system of units used.

Calculating the normalized gas mass flow rate is important because it allows the meter to be applied to the wells or situations where the pressure or meter diameter for the liquids present are different than the conditions under which the meter was originally calibrated. This means that the differential pressure flowmeter does not need to be calibrated under conditions identical to those present in a particular application and that the differential pressure flowmeter may be sized to match the production rate from a particular well.

The functional form of Equation 2 is arrived at by derivation from the conservation of mass and energy followed by a simplifying approximation. Other functional forms of Equation 2 can be used with equivalent results. The functional form of Equation 2 is consistent with the conservation laws and provides a good representation of the calibration data.

The third step is computing a gas mass flow rate using the normalized gas mass flow rate, the gas density, and a contraction ratio of the venturi tube. The equation for calculating the gas phase mass flow rate from these quantities is:

$$\text{mg} = mgm \cdot A_t \cdot \frac{\sqrt{rho_{gw}}}{1 - \beta^4} \qquad \text{Equation 3}$$

where, mgm is the normalized gas mass flow rate;
$A_t$ is the venturi throat area;
β is the contraction ratio of the throat area; and
$rho_{gw}$ is the gas density at current well conditions.

The fourth step is estimating the gas velocity in the venturi tube throat. The equation for estimating the gas velocity is:

$$u_g = \frac{m_g}{rho_g \cdot A_t} \qquad \text{Equation 4}$$

where, $m_g$ is the gas mass flow rate;
$rho_g$ is the density of the gas phase for a specific well; and
$A_t$ is the venturi throat area.

The fifth step is calculating the pressure drop experienced by the gas phase due to work performed by the gas phase in accelerating the liquid phase between an upstream pressure measuring point and a pressure measuring point in the distal end of the venturi throat. The pressure drop is calculated as follows:

$$\Delta P_{gl3} = \Delta P_3 - \frac{1}{2} \cdot rho_{gw} \cdot u_g^2 \cdot (1 - \beta^4) \qquad \text{Equation 5}$$

where, $\Delta P_3$ is the measured pressure differential across a venturi contraction;
$rho_{gw}$ is gas density at well conditions;
$u_g$ is the gas velocity in the venturi throat; and
β is the contraction ratio of the throat area to the upstream area.

It is important to note that the calculations outlined in steps two and five are important because they allow for estimating the mass flow of each phase.

Step six is estimating the liquid velocity ($u_l$) in the venturi throat using the calculated pressure drop experienced by the gas phase due to work performed by the gas phase. This is performed as follows:

$$u_l = \sqrt{\frac{2(\Delta P_3 - \Delta P_{gl3})}{rho_l \cdot [(1 + \beta^4) + gcfw]}} \qquad \text{Equation 6}$$

where, $\Delta P_3$ is the measured pressure differential across a venturi contraction;

$\Delta P_{gl3}$ is the pressure drop experienced by the gas-phase due to work performed by the gas phase on the liquid phase;
$rho_l$ is the liquid density; and
gcfw is a constant which characterizes wall friction.

The preferred value for gcfw is defined as 0.062. This value may be adjusted depending on different venturi geometries or different fluids.

The seventh step is computing the friction between the liquid phase and a wall in the venturi which is performed:

$$f = gcfw \cdot \frac{1}{2} \cdot rho_l \cdot u_l^2 \qquad \text{Equation 7}$$

where, gcfw is a constant which characterizes wall friction;
$rho_l$ is the liquid density; and
$u_l$ is the liquid velocity in the venturi throat.

The eighth step is calculating the total mass flow rate based on the measured pressure in the venturi throat, the calculated friction and the gas velocity. The equation for this is:

$$m_t = \frac{2(\Delta P_3 - f)}{(1 - \beta^4) \cdot u_g} \cdot A_t \qquad \text{Equation 8}$$

where, $\Delta P_3$ is the measured pressure differential across a venturi contraction;
β is the contraction ratio of the throat diameter to the upstream diameter; and
$u_g$ is the gas velocity in the venturi throat.

The liquid phase mass flow rate can now be calculated as the difference between the total and gas mass flow rates:

$$m_l = (m_t - m_g) \qquad \text{Equation 9}$$

where, $m_t$ is the total mass flow rate; and
$m_g$ is the gas mass flow rate.

Calculating the gas phase mass flow rate, total mass flow rate, and liquid phase mass flow rate using the method outlined above is much more accurate than the prior art. The accuracy of method outlined above is within ±4% for the gas phase, ±5% for the liquid phase, and ±4% for the total mass flow. This accuracy can even be increased using measured calibrations for a specific installation to benchmark the readings.

Figure 3:
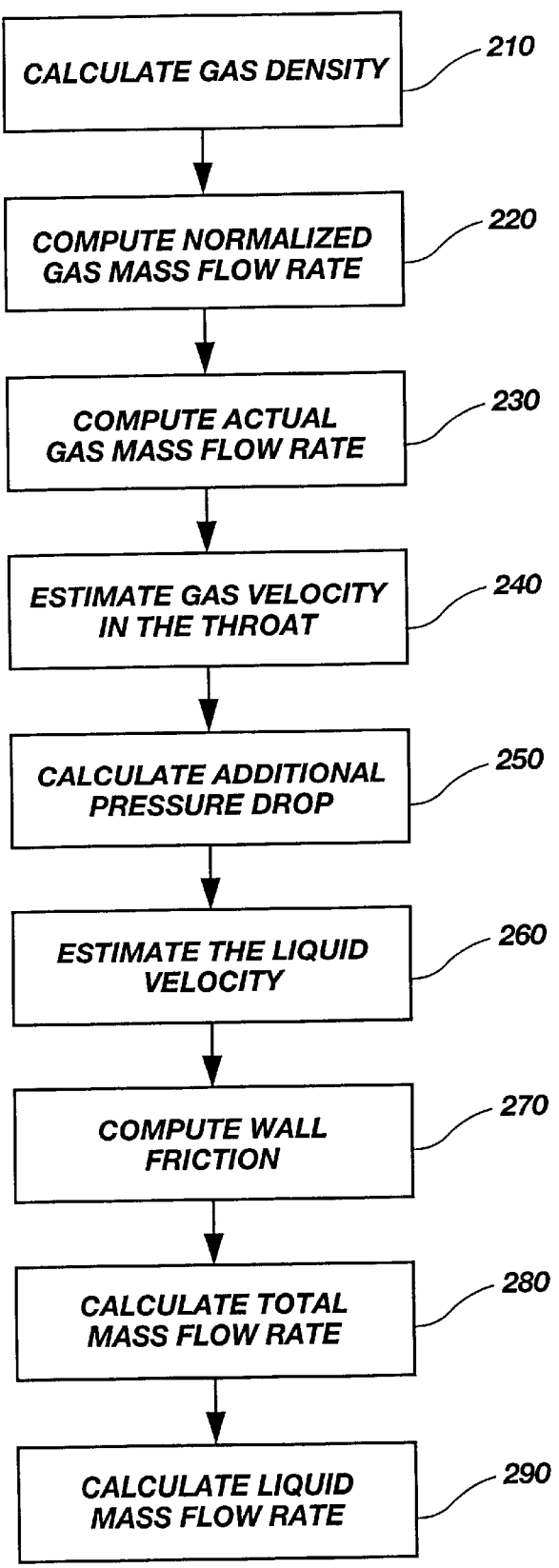
FIG. 3 is a flow chart depicting an embodiment of a method for calculating respective liquid and gas phase mass flow rates of a multiphase flow.

FIG. 3 shows a summary of the method used to accurately calculate the mass flow rates through the elongated venturi. The method for determining the respective mass flow rates of the high void fraction fluid flow and the gas phase flow includes steps which were described with Equations 1–9. Referring to FIG. 3, the first step is calculating a gas phase density for the gas flow 210. The next two steps are finding a normalized gas phase mass flow rate through the venturi 220 and computing a gas mass flow rate 230. The following step is estimating the gas velocity in the venturi tube throat 240. The next step is calculating the pressure drop experienced by the gas phase due to work performed by the gas phase in accelerating the liquid phase between the upstream pressure measuring point and the pressure measuring point in the venturi throat 250. Yet another step is estimating the liquid velocity 260 in the venturi throat using the calculated pressure drop experienced by the gas-phase due to work performed by the gas phase. Then the friction is computed 270 between the liquid phase and a wall in the venturi tube. Finally, the total mass flow rate based on measured pressure in the venturi throat is calculated 280 and the liquid phase mass flow rate is determined 290.

Theoretical Gas Mass Flow Rate

Now a discussion of the theoretical derivations will be outlined which produced the method described above. The theoretical derivation is based on the physical laws describing the conservation of mass and energy for both the gas and liquid phases. The conservation of mass and energy equations for each phase are shown below where the subscript 1 denotes the upstream condition measured at 142 by pressure tap 150 in FIG. 1, and the subscript 2 denotes the venturi throat entrance measured at 134A by pressure tap 154. $\Delta P_{gl3}$ is the pressure drop experienced by the gas phase due to work done by the gas phase in accelerating the liquid phase between the pressure measuring location at the beginning of the elongated throat and the pressure measuring location at the end of the throat. It is assumed that only the liquid phase is in contact with the wall, $f_w$ is the wall friction coefficient and $G_c$ is a geometry factor which accounts for the acceleration of the fluid in the venturi contraction and the surface area of the contraction.

$$m_g = \alpha_1 \rho_g u_{g1} A_1 = \alpha_2 \rho_g u_{g2} A_2 \qquad \text{Equations 10}$$

$$m_l = (1-\alpha_1)\rho_l u_{l1} A_1 = (1-\alpha_2)\rho_l u_{l2} A_2$$

$$P_1 + \frac{1}{2}\rho_g u_{g1}^2 = P_2 + \frac{1}{2}\rho_g u_{g2}^2 + \Delta P_{gl3}$$

$$P_1 + \frac{1}{2}\rho_l u_{l1}^2 = P_2 + \frac{1}{2}\rho_l u_{l2}^2 - \Delta P_{gl3} + G_c f_w \frac{1}{2}\rho_l u_{l2}^2$$

In Equations 10, $\alpha$ is void fraction, $\rho_g$ is density of a gas at standard temperature, $u_g$ is the gas velocity, $A_1$ is the conduit area upstream of the venturi, $A_2$ is the conduit area in the venturi throat, and $_p$ and $_p$ are the pressures at locations 142 (tap 150) and 134A (tap 154) in the conduit. Generally, void fraction $\alpha$ refers to the percentage of the cross-sectional area $A_{pipe}$ of the conduit occupied by the gas phase of the multiphase fluid, and may be expressed as $\alpha_1 = A_{gas}/A_{pipe}$. It follows that the percentage of the cross-sectional area $A_{pipe}$ of the conduit occupied by the liquid phase of the multiphase fluid may be expressed as $\alpha_2 = (1-\alpha_1)$, or $A_{liquid}/A_{pipe}$.

The gas phase energy equation can be rewritten using the equation for the gas phase mass flow rate, where D is the diameter of the upstream piping, d is the throat diameter, $\beta = d/D$ is the contraction ratio, and $\Delta P_3 = P_2 - P_1$ is the pressure drop across the contraction:

$$\Delta P_3 = \frac{1}{2}\frac{m_g^2}{\rho_g \alpha_2^2 A_2^2}\left(1 - \left(\frac{\alpha_2}{\alpha_1}\right)^2 \beta^4\right) + \Delta P_{gl3} \qquad \text{Equation 11}$$

With the approximation that $\alpha_1$ and $\alpha_2 \cong 1$, the modified orifice equation results.

$$\Delta P_3 \approx \frac{1}{2}\frac{m_g^2}{\rho_g A^2}(1-\beta^4) + \Delta P_{gl3} \qquad \text{Equation 12}$$

For single-phase flow $\Delta P_{gl3}$ is equal to zero and the equation is solved directly for the mass flow rate $m_g$. In practice, the single-phase result is modified by the addition of an empirical constant $C_c$ which accounts for the true discharge characteristics (non-ideal one-dimensional behavior and friction losses) of the nozzle and Y which takes compressibility effects into account.

$$m_{g1\phi} = \frac{C_c A Y}{\sqrt{1-\beta^4}}\sqrt{2\rho_g \Delta P_3} \qquad \text{Equation 13}$$

As shown in the introduction, if the Equation 13 above is used under multiphase conditions, the mass flow rate of the gas phase can be significantly overestimated. Under multiphase conditions the mass flow rate of the gas phase is given by:

$$m_g = \frac{C_{2\phi}\alpha_2 A_2 Y}{\sqrt{1-\left(\frac{\alpha_2}{\alpha_1}\right)^2 \beta^4}}\sqrt{2\rho_g(\Delta P_3 - \Delta P_{gl3})} \qquad \text{Equation 14}$$

where $\alpha_2 A_2$ represents the cross sectional area occupied by the gas phase. When $\Delta P_3$ is large with respect to $\Delta P_{gl3}$ the quantity under the radical can be approximated by:

$$\sqrt{\Delta P_{3-\Delta P_{gl3}}} \approx \sqrt{\Delta P_3} - C_{gl3} \times \sqrt{\Delta P_{gl3}} \qquad \text{Equation 15}$$

where $C_{gl3}$ is a constant that is determined experimentally. Empirically it has been found that $\Delta Pgl3$ can be replaced by a function of $\Delta P_2$, the pressure drop in the extended throat, with appropriate choice of constants. The mass flow rate of gas under both single phase and multiphase conditions now becomes:

$$m_g \frac{C_{2\phi} A Y}{\sqrt{1-\beta^4}}\sqrt{2\rho_g}\left[\sqrt{\Delta P_3} - C_2 \times \sqrt{P_2}\right] \qquad \text{Equation 16}$$

where it has been assumed that $\alpha_2 \approx \alpha_1 \approx 1$. The constants $C_{2\phi}$ and $C_2$ have been determined empirically and the validity of the equation has been tested over a wide range of conditions. It is important to note that this method can be used not only with natural gas production but other gas and liquid phase compositions. In addition, it is also important to recognize that Equations 10–16 are used to derive calculation steps in the calculation method.

We have assumed that $\alpha_2 \approx \alpha_1 \approx 1$, making Equation 16 above only approximate. The statistical fitting procedure used to determine the constants $C_{2\phi}$ and $C_2$ implicitly determines a weighted mean value of $\alpha$. Because $\alpha$ does not appear explicitly and is unknown, there is an uncertainty of $\pm 1$–2% over the void fraction range $0.95 < \alpha < 1.0$, implicit in the equation. If $\alpha$ or $(1-\alpha)$ is independently measured, the observed measurement uncertainties can be significantly reduced. The uncertainty can also be significantly reduced if, at installation, the actual flow rates are accurately known. If this measurement is available then the meter reading can be adjusted to reflect the true value and the uncertainty in the gas phase mass flow rate measurement can be reduced to less than 0.5% of reading if the gas and liquid flow rates change by less than 50% or so over time. The repeatability of the measurement is essentially the random uncertainty in the pressure measurements, less than about 0.5% of reading. Note that various types of instrumentation and methods suitable for determining $\alpha$ are discussed elsewhere herein.

Total and Liquid Mass Flow Rate

If the ratio of liquid to gas flow rate is known a priori with certainty then the mass flow rate of the liquid phase can be directly obtained from $m_l = m_g (m_l/m_g)_{known}$. Note that because the liquid mass flow rate is only a fraction (0–30%) of the gas mass flow rate the uncertainty in the measurement is magnified. For instance, if $m_l/m_g = 0.01$, a 1% error in $m_g$ is magnified to become a 100% of reading error for the liquid phase. An additional fixed error of 1% in the ratio $m_l/m_g$ results in a 200% of reading total error for the liquid phase. This approach, of course, assumes that the $m_l/m_g$ ratio remains constant over time.

Unfortunately, without accurate independent knowledge of α or (1−α) the liquid mass flow rate cannot be obtained directly from one-dimensional theory. The velocity of the liquid phase can, however, be estimated directly as now described. Once the mass flow rate of the gas phase is determined the $\Delta P_{gl3}$ term can be estimated from the gas phase energy equation:

$$\Delta P_{gl3} \approx \Delta P_3 - \frac{1}{2} \frac{m_g^2}{\rho_g A^2}(1 - \beta^4) \qquad \text{Equation 17}$$

Equation 17 allows us to derive Equation 5 in the calculation method. Rearranging the liquid phase energy equation yields:

$$\Delta P_3 + \Delta P_{gl3} = \frac{1}{2}\rho_l u_{l2}^2 \left(1 - \frac{u_{l1}^2}{u_{l2}^2}\right) + G_c f_w \frac{1}{2}\rho_l u_{l2}^2 \qquad \text{Equation 18}$$

and using the expression for the mass flow rate of liquid results in:

$$\Delta P_3 + \Delta P_{gl3} = \frac{1}{2}\rho_l u_{l2}^2 \left(1 - \frac{(1-\alpha_2)^2}{(1-\alpha_1)^2}\beta^4\right) + G_c f_w \frac{1}{2}\rho_l u_{l2}^2 \qquad \text{Equation 19}$$

With the assumption that:

$$\frac{(1-\alpha_2)^2}{(1-\alpha_1)^2}\beta^4 << 1$$

the liquid velocity $u_{l2}$ can be estimated. If (1−α) is known then the liquid mass flow rate could be estimated directly from $m_l = (1-\alpha_2)\rho u_{l2} A$. Unfortunately, (1−α) cannot be accurately estimated directly from the differential pressure data; it must be independently measured to pursue this approach.

If we consider the gas and liquid phases together but allow their velocities to differ, the total mass flow rate can be written as:

$$m_t = m_g + m_l = \left(\alpha \rho_g + \frac{(1-\alpha)}{S}\rho_l\right) u_g A \qquad \text{Equation 20}$$

where the density term in brackets is the effective density, $\rho_{slip}$ and $S = u_g/u_l$ which is ratio of the gas velocity to the liquid velocity or slip. Since $m_t$ is constant throughout the venturi, it allows us to write the pressure drop $\Delta P_3$ as:

$$\Delta P_3 = \frac{1}{2}\left(\alpha \rho_g + \frac{(1-\alpha)}{S}\rho_l\right) u_g^2 (1-\beta^4) + G_c f_w \frac{1}{2}\rho_l u_{l2}^2 \qquad \text{Equation 21}$$

The second term on the right hand side is the friction loss assuming that only the liquid phase is in contact with the wall. The equation can be rearranged to yield the total mass flow rate:

$$m_t = \left(\alpha \rho_g + \frac{(1-\alpha)}{S}\rho_l\right) u_g A = \frac{2\left(\Delta P_3 - G_c f_w \frac{1}{2}\rho_l u_{l2}^2\right) A}{(1-\beta^4) \cdot u_g} \qquad \text{Equation 22}$$

The total mass flow rate $m_t$ can then be obtained directly from $\Delta P_3$ once $u_g$ is estimated from the measured value of $m_g$, $u_g = m_g/\rho_g A$ and the liquid velocity is calculated by solving equation 19 for $U_{l2}$. The total mass flow rate using this method is a measurement with an uncertainty of ±4% of the actual measured flow. In principle, (since the total mass flow rate is the sum of the gas and liquid mass flow rates) the liquid mass flow rate can now be obtained directly from $m_l = m_t - m_g$. The liquid mass flow rate can then be obtained within ±5% of the total mass flow rate.

As previously noted in the discussion of the measurement of the gas mass flow rate, if the flow rates of each phase are accurately known at the time of installation, measurement performance over a reasonable range of mass flow rates can be significantly enhanced. The uncertainty in the gas mass flow rate measurement can be reduced to <0.5% of reading by benchmarking even if the gas and/or liquid mass flow rates change by ±50%. Similarly, the uncertainty in the total mass flow rate can be reduced by <2% of reading for the same ±50% changes in gas and/or liquid mass flow rates. The corresponding improvement in accuracy of the liquid phase measurement is also significant.

Because the liquid mass flow rate measurement is dependent on both the gas phase and total mass flow rate measurements, the uncertainty is also sensitive to changes in both gas and liquid mass flow rate. If the liquid mass flow rate measurement is benchmarked at an initial value, the data indicate that the accuracy attainable is ±20% of reading for changes in gas mass flow rate in the range of ≦±15% and/or changes in liquid mass flow rate in the range of ≦±25%. The uncertainty in the liquid mass flow rate quoted in terms of percent of total mass flow rate becomes ±1%.

Measurement uncertainties can be significantly reduced if flow rates are accurately known at time of meter installation or periodically measured by separation and separate metering during the service life of the meter and the well. Because the liquid phase is generally only a small fraction of the total mass flow rate the uncertainty in its measurement is inherently high. If the void fraction α is accurately and independently measured, the liquid mass flow rate can be calculated directly from $m_l = (1-\alpha) l_l u_{l2} A$ where the $u_{l2}$ the liquid velocity is obtained as described above from equation 19. The void fraction may be accurately and independently measured using a gamma ray attenuation densitometer or through ultrasonic film thickness measurements. This approach has been shown to significantly reduce the uncertainty in the liquid mass flow rate measurement.

It will be appreciated that the methods and processes disclosed herein are well suited for implementation by various types of computer software and the like. Thus, the present invention contemplates as being within its purview, computer readable media for carrying or having computer-executable instructions or electronic content structures stored thereon. In one embodiment of the invention, such computer executable instructions employ pressure differential data, obtained by way of differential pressure flow meter (FIGS. 1 and 2) for example, to calculate respective liquid and gas phase mass flow rates of a multiphase flow passing through the differential pressure flow meter, in a manner consistent with the multiphase flow calculation method disclosed herein.

Generally, computer-readable media for carrying or storing such computer-executable instructions may be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or electronic content structures and which can be accessed by a general purpose or special purpose computer.

It will be appreciated that such desired program code and computer executable instructions may take a variety of forms including but not limited to, source code, executable code, hypertext markup language (HTML), extensible markup language (XML), meta languages such as standard generalized markup languages (SGML), and the like.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and content which cause a general purpose computer, special purpose computer, or special purpose processing device to perform a certain function or group of functions.

Figure 4:
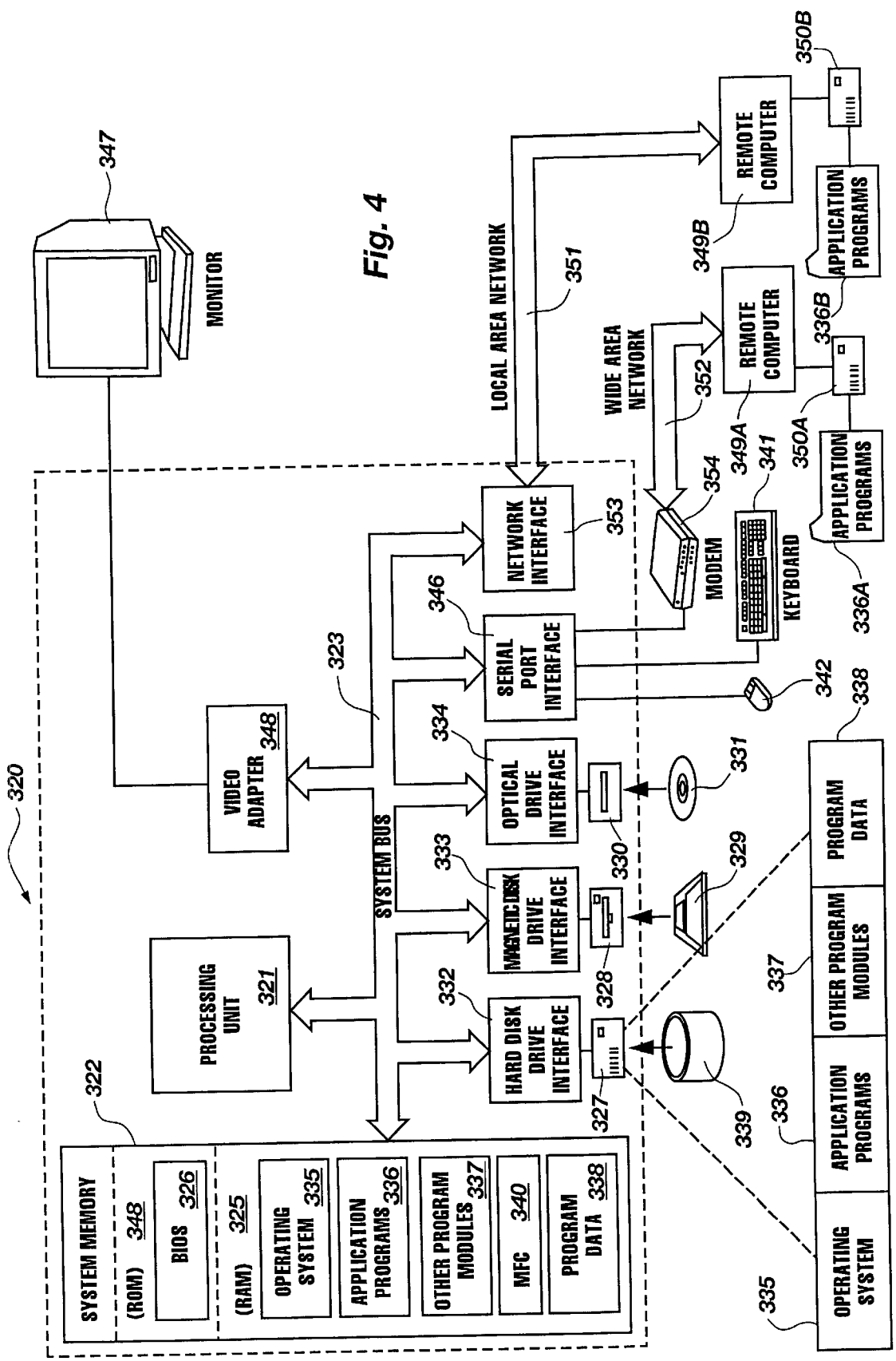
FIG. 4 illustrates an exemplary system that provides a suitable operating environment for embodiments of multiphase flow calculation software.

FIG. 4 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, content structures, etc. that perform particular tasks or implement particular abstract content types. Computer-executable instructions, associated content structures, and program modules represent examples of the program code means for executing steps of the methods disclosed herein. The particular sequence of such executable instructions or associated content structures represent examples of corresponding acts for implementing the functions described in such steps.

Those skilled in the art will appreciate that the invention may be practiced in network computing environments with many types of computer system configurations, including personal computers, laptops, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. Note that, as contemplated herein such wireless links include, but are not limited to, links such as are commonly employed to facilitate cellular based communications (such as in cellular phones and the like), satellite based links, and the like. Finally, it will be appreciated that in a distributed computing environment, program modules may be located in both local and remote memory storage devices.

With respect to communications implemented within embodiments of the present invention, it will be appreciated that various types of wireless communications methods, devices, and systems, such as the cellular and satellite systems discussed above, may be employed in conjunction with other aspects of the invention and do not apply solely to the distributed computing aspect of the invention. By way of example, various types of wireless links may be employed to communicate raw data, such as void fraction $\alpha$, pressure differential data, and/or other data, to client computer 320. As another example, instructions produced or transmitted by client computer 320 may be transmitted to control system 500, discussed below in the context of FIG. 6, by various wireless communication methods, devices, and systems.

In general, it is contemplated that some, or all, of the data communication, or any other communication, steps and processes disclosed herein may be accomplished through the use of wireless communication methods, devices, and systems, or combinations thereof. Finally, it will be appreciated that, as suggested above, various combinations of hardwire based and wireless based communications may additionally, or alternatively, be employed as required to suit a particular application and/or to facilitate achievement of one or more desired results, and the scope of the present invention should, accordingly, not be construed to be limited to any particular type of communication method, device, or system.

With reference now to FIG. 4, an exemplary system for implementing the invention includes a general purpose computing device in the form of a client computer 320, including a processing unit 321, a system memory 322, and a system bus 323 that couples various system components including system memory 322 to processing unit 321. System bus 323 may be any of several types of bus structures including a memory bus or memory controller, a peripheral bus, and a local bus using any of a variety of bus architectures. System memory 322 includes read only memory (ROM) 324 and random access memory (RAM) 325. A basic input/output system (BIOS) 326, containing the basic routines that help transfer information between elements within client computer 320, such as during start-up, may be stored in ROM 324.

Client computer 320 may also include a magnetic hard disk drive 327 for reading from and writing to a magnetic hard disk 339, a magnetic disk drive 328 for reading from or writing to a removable magnetic disk 329, and an optical disk drive 330 for reading from or writing to removable optical disk 331 such as a CD-ROM or other optical media. Magnetic hard disk drive 327, magnetic disk drive 328, and optical disk drive 330 are connected to system bus 323 by a hard disk drive interface 332, a magnetic disk drive interface 333, and an optical disk drive interface 334, respectively. Such drives and their associated computer-readable media provide nonvolatile storage of computer-executable instructions, content structures, program modules and other content for client computer 320.

Although the exemplary environment described herein employs a magnetic hard disk 339, a removable magnetic disk 329 and a removable optical disk 331, it will be appreciated that various other types of computer readable media for storing content can be used, including magnetic cassettes, flash memory cards, digital video disks, Bernoulli cartridges, RAMs, ROMs, and the like.

Program code means comprising one or more program modules may be stored on hard disk 339, magnetic disk 329, optical disk 331, ROM 324 or RAM 325, including an operating system 335, one or more application programs 336, other program modules 337, program data 338, and multiphase flow calculation (MFC) software 340. A user may enter commands and information into computer 100 through keyboard 341, pointing device 342, or other input devices (not shown), such as a microphone, joy stick, game pad, satellite dish, scanner, or the like. These and other input devices are often connected to processing unit 321 through a serial port interface 346 coupled to system bus 323. Alternatively, the input devices may be connected by other interfaces, such as a parallel port, a game port or a universal serial bus (USB). A monitor 347 or another display device is also connected to system bus 323 via an interface, such as video adapter 348. In addition to monitor 347, personal computers typically include other peripheral output devices (not shown), such as speakers, printers, scanners, and the like.

In some embodiments of the invention, client computer 320 operates in a networked environment, also referred to herein as a "client-server" environment, using logical connections to one or more servers. It will be appreciated that remote computers 349A and 349B, for example, may serve in such a capacity. It will further be appreciated that client computer 320 may additionally, or alternatively, be employed in the context of various types of control systems, an example of which is discussed below in the context of FIG. 2. Note that as contemplated herein, a 'server' refers to a computer in a network shared by multiple users, and the term 'server' may also refer to both the hardware and/or software that performs one or more of the service(s), tasks, operations, and functions disclosed herein.

Examples of types of servers contemplated as being within the scope of the present invention include, but are not limited to, web servers, application servers, remote access servers, mail servers, merchant servers, database servers, and the like. Further, remote computers 349A and 349B may each be another personal computer, a server, a router, a network PC, a peer device or other common network node, and typically includes many or all of the elements described above relative to client computer 320, although only memory storage devices 350A and 350B and their associated application programs 336A and 336B have been illustrated in FIG. 4. As discussed earlier, communications between two or more of such servers, computers, and the like may be accomplished by wireless or hardwire based communications systems, methods, and devices, or by various combinations of hardwire and wireless based systems, methods, and devices. Finally, in at least some embodiments of the present invention, one or more data gathering steps, data processing steps, and/or data display steps is performed at, or in conjunction with, a web site located on a server. By way of example, some or all of the features and capabilities of MFC software 340 may be embodied in the form of one or more web sites, each having one or more web pages, located on a designated server or other similarly configured computer or device. Such a web site, or web sites, may be employed in conjunction with any number of multiphase flows.

The logical connections depicted in FIG. 4 include a local area network (LAN) 351 and a wide area network (WAN) 352 that are presented here by way of example and not limitation. Such networking environments are commonplace, and include, but are not limited to, in office-wide or enterprise-wide computer networks, intranets, the Internet, and the like.

When used in a LAN networking environment, client computer 320 is connected to LAN 351 through a network interface 353. When used in a WAN 352 networking environment, client computer 320 may include a modem 354, a wireless link, or other means for establishing communications over WAN 352. Modem 354, which may be internal or external to client computer 320, is connected to system bus 323 via serial port interface 346. In a networked environment, program modules depicted relative to client computer 320, or portions thereof, may be stored in remote memory storage device(s) 350A and 350B. It will be appreciated that the network connections shown are exemplary and other means of establishing communications over WAN 352 may be used.

Figure 5:
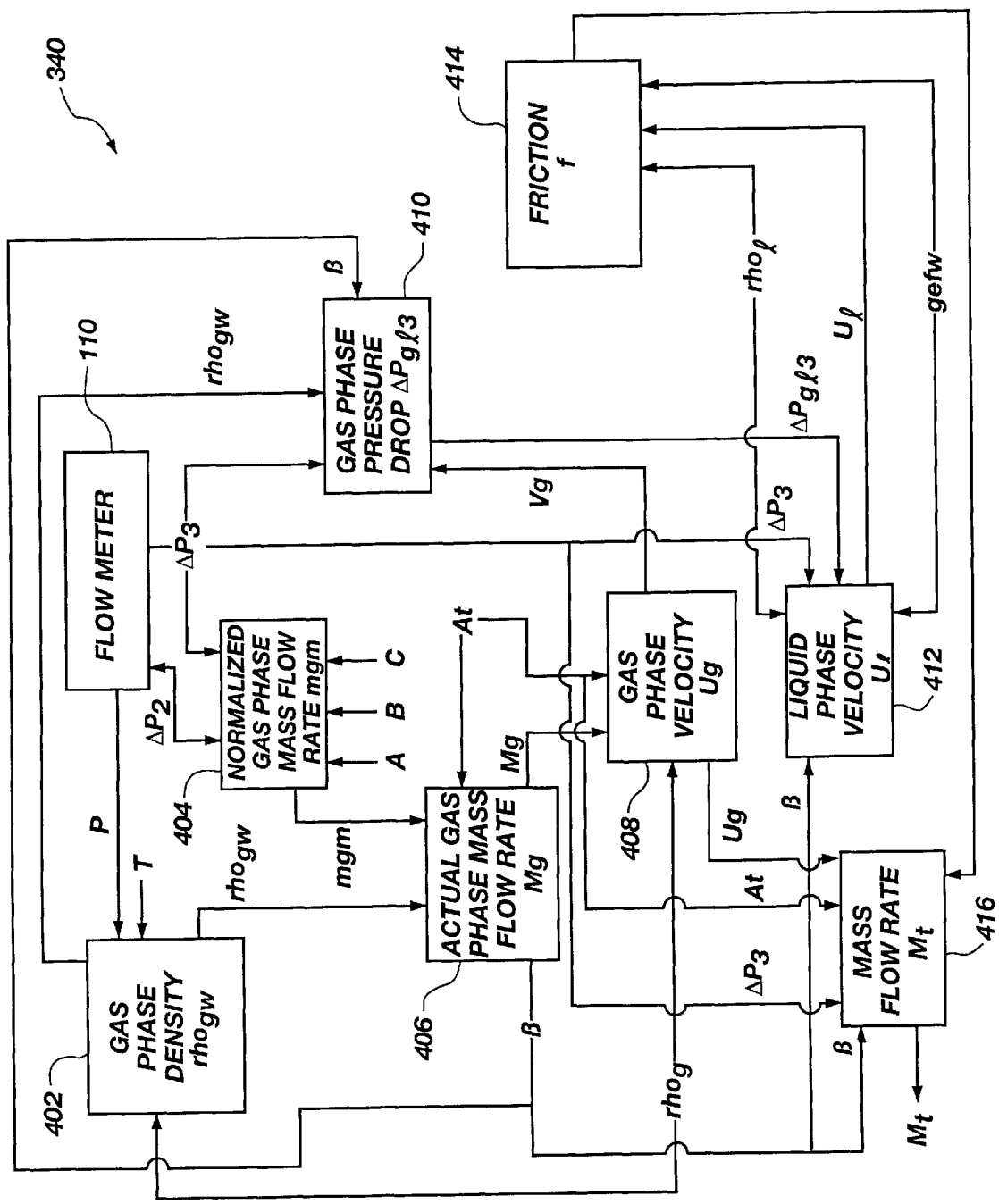
FIG. 5 is a schematic view which illustrates various relational and functional aspects of an embodiment of multiphase flow calculation software.

Directing attention now to FIG. 5, and with continuing attention to FIGS. 3 and 4, various details are provided regarding an embodiment of MFC software 340 according to the present invention. Generally, MFC software 340 serves to determine, among other things, the respective mass flow rates of gas and liquid phases of a multiphase flow, and is particularly useful for analyzing high void fraction multiphase flows. Typically, embodiments of MFC 340 employ a variety of calculated inputs, various experimentally determined constants, as well as pressure differential data in performing such analyses, and others. As discussed below in the context of FIG. 6, one way to obtain such pressure differential data is by way of pressure differential flow meter 110 (exemplary embodiments of which are illustrated in FIGS. 1 and 2), and various pressure sensing devices such as pressure transducers (FIGS. 1 and 6) and the like.

It will be appreciated that the various calculation and computation acts illustrated or otherwise embodied or suggested in FIGS. 3 and 5, and discussed herein, simply comprise exemplary acts which, when performed, implement particular respective functions, and the scope of the present invention should accordingly not be limited to the acts specified herein. That is, such functions may be achieved by performance of any of a variety of different acts. By way of example, the act of computing (FIG. 3) an actual gas phase mass flow rate comprises but one example of a step for performing the function of determining an actual gas phase mass flow rate. Alternatively, the step for determining an actual gas phase mass flow rate may, instead of being implemented by the act of a calculation, be implemented by various other acts including, but not limited to, acts of experimentation or estimation.

In addition to the aforementioned calculation and computation acts, the process indicated in FIG. 3 additionally includes various steps such as estimating a gas phase velocity in the extended throat may be performed. It will be appreciated that such steps may be performed by way of a variety of different acts. For example, the aforementioned step may be performed by acts including, but not limited to, calculation or experimentation.

Directing specific attention now to FIG. 5, various details are provided regarding certain aspects of the structure and operation of an embodiment of MFC software 340. Generally, MFC software 340 comprises a plurality of modules, each of which receives input from a variety of sources including, but not limited to, components such as differential pressure flow meter 110 (FIGS. 1 and 2), one or more other modules of MFC software 340, and/or system memory 322 of client computer 320 (FIG. 4). In one embodiment of the present invention, system memory 322 contains data concerning various experimentally determined constants, reference values, and the like.

Upon receiving such input, each module then generates one or more outputs corresponding to the input received. Typically, the outputs thus generated are provided as input to one or more other modules. However, it will be appreciated that such outputs may, by way of example, be displayed at monitor 347 (FIG. 4) or the like, be stored as program data 338 (FIG. 4), such as in a database structure, for further processing and/or analysis by client computer 320 or other computers, be used as inputs to various types of control systems and the like, and/or be displayed or otherwise presented on an internet or intranet site, or the like.

Turning now to the various modules, the illustrated embodiment of MFC software 340 comprises a gas phase density $rho_{gw}$ module 402, normalized gas phase mass flow rate mgm module 404, actual gas phase mass flow rate $m_g$ module 406, gas phase velocity $u_g$ module 408, gas phase pressure drop $\Delta P_{g/3}$ module 410, liquid phase velocity $u_l$ module 412, friction f module 414, and multiphase flow mass flow rate $m_t$ module 416.

With continuing attention to FIG. 5, details are provided regarding various operational aspects of an embodiment of MFC software 340. Note that as the various inputs and outputs produced by the modules, as well as the formulae and the like which are used to generate such inputs and outputs, are discussed in detail elsewhere herein, further discussion thereof is not necessary at this juncture. Rather, the following discussion will focus primarily on the interrelations between and among the various modules that comprise MFC software 340.

In operation, gas phase density $rho_{gw}$ module 402 receives inputs T, preferably from a thermometer or the like in communication with the multiphase flow entering differential pressure flowmeter 110, and reference gas density $rho_g$. Note that reference gas density $rho_g$ preferably comprises the density of natural gas at standard temperature and pressure. Finally, gas phase density $rho_{gw}$ module 402 receives input P comprising the pressure of the multiphase flow at the entrance of differential pressure flowmeter 110. Upon receiving such inputs, gas phase density $rho_{gw}$ module 402 calculates gas phase density $rho_{gw}$ and provides the calculated gas phase density $rho_{gw}$ as an input to actual gas phase mass flow rate $m_g$ module 406, discussed below.

In addition to providing input to gas phase density $rho_{gw}$ module 402, differential pressure flowmeter 110 also provides, by way of pressure measuring points and pressure transducers (FIGS. 1 and 6), measured pressure differential $\Delta P_2$ and measured pressure differential $\Delta P_3$ as inputs to, among others, normalized gas phase mass flow rate mgm module 404. In addition, normalized gas phase mass flow rate mgm module 404 receives experimental constant inputs A, B, and C, preferably from system memory 322. Upon receipt of such inputs, normalized gas phase mass flow rate mgm module 404 calculates the normalized gas phase mass flow rate mgm and provides the normalized gas phase mass flow rate mgm as an input to actual gas phase mass flow rate $m_g$ module 406.

As indicated in FIG. 5, actual gas phase mass flow rate $m_g$ module 406 receives, in addition to gas phase density $rho_{gw}$ from gas phase density $rho_{gw}$ module 402 and normalized gas phase mass flow rate mgm from normalized gas phase mass flow rate mgm module 404, contraction ratio $\beta$ and area $A_t$, both preferably originating from system memory 322. Upon receipt of such inputs, actual gas phase mass flow rate $m_g$ module 406 calculates, and provides as input to gas phase velocity $u_g$ module 408, actual gas phase mass flow rate $m_g$.

Gas phase velocity $u_g$ module 408 additionally receives reference gas density $rho_g$, and area $A_t$. These inputs are collectively used by gas phase velocity $u_g$ module 408 to calculate gas phase velocity $u_g$, which is then provided as an input to gas phase pressure drop $\Delta P_{g/3}$ module 410.

In addition to gas phase velocity $u_g$, gas phase pressure drop $\Delta P_{g/3}$ module 410 additionally receives calculated gas phase density $rho_{gw}$, measured pressure differential $\Delta P_3$, and contraction ratio $\beta$. Upon receiving such input, gas phase pressure drop $\Delta P_{g/3}$ module 410 then calculates gas phase pressure drop $\Delta P_{g/3}$ and provides the same as an input to liquid phase velocity $u_l$ module 412.

Liquid phase velocity $u_l$ module 412 receives various other inputs as well. In particular, liquid phase velocity $u_l$ module 412 receives contraction ratio $\beta$, liquid phase density $rho_l$, measured pressure differential $\Delta P_3$, and wall friction constant gcfw. These inputs are then used to calculate liquid phase velocity $u_l$ which is then provided as an input to friction f module 414. Additionally, friction f module 414 receives liquid phase density $rho_l$, and wall friction constant gcfw, which are then used to calculate friction f between the wall of differential pressure flowmeter 110 (FIGS. 1 and 2) and the liquid phase of the multiphase flow. Friction f is then used as an input to multiphase flow mass flow rate $m_t$ module 416, discussed below. Finally, in an alternative embodiment, considered below in the context of liquid phase mass flow rate $m_l$ calculations, liquid phase velocity $u_l$ is provided as one input to a liquid phase mass flow rate $m_l$ module (not shown).

With continuing reference now to the calculation of multiphase flow mass flow rate $m_t$, multiphase flow mass flow rate $m_t$ module 416 receives, in addition to friction f, measured pressure differential $\Delta P_3$, area $A_t$, contraction ratio $\beta$, and gas phase velocity $u_g$. These inputs are then used by multiphase flow mass flow rate $m_t$ module 416 to calculate multiphase flow mass flow rate $m_t$. It will be appreciated that the liquid phase mass flow rate $m_l$ may now be readily calculated by simply taking the difference between the calculated multiphase flow mass flow rate $m_t$ and the calculated gas phase mass flow rate $m_g$.

As suggested earlier, the liquid phase mass flow rate $m_l$ may alternatively be calculated by way of a liquid phase mass flow rate $m_l$ module which employs, among other things, the liquid phase velocity $u_l$ calculated by liquid phase velocity $u_l$ module 412. In particular, one embodiment of such a liquid phase mass flow rate $m_l$ module uses liquid phase velocity $u_l$, liquid phase fraction $1-\alpha$ (calculated from a measured void fraction $\alpha$), $A_{liquid}$, and liquid phase density $rho_l$, using the following equation:

$$m_l = (1-\alpha) \cdot rho_l \cdot u_l \cdot A_{pipe}$$

In this alternative embodiment, void fraction $\alpha$ is preferably determined through the use of various types of instrumentation including, but not limited to, gamma ray densitometers, ultrasonic film thickness meters, and the like.

It will be appreciated that, with respect to the various determinations made by MFC software 340, one or more of the calculated parameters may alternatively be determined by acts other than calculation. For example, one or more calculated parameters may be determined by way of experimentation or empirical observation. In general however, any act, method, process, system, software, module, executable code or the like, or combinations thereof, that is effective in making the determinations contemplated hereby is considered to be within the scope of the present invention.

With continuing reference to FIG. 5, and renewed reference to FIG. 4, it will further be appreciated that the functionality associated with particular modules indicated in FIG. 5 is exemplary with respect, at least, to the scope of the functionality of that module, and that the functionalities of a plurality of modules may be combined together in a single module. Further, the calculations performed by MFC software 340 need not all be performed exclusively at client computer 320, but some, or all, of such calculations, may alternatively be performed at one or more other sites without impairing the functionality of embodiments of the present invention.

Additionally, it will be appreciated that some embodiments of MFC software 340 are configured for use in a central location, such as a server of an intranet, LAN, or WAN, and arranged to simultaneously receive inputs regarding a plurality of different multiphase flows. In the aforementioned exemplary configuration, MFC software 340 performs, preferably simultaneously, liquid and gas phase mass flow rate calculations for each of the multiphase flows. In this way, MFC software 340 may simultaneously monitor, at least, a plurality of multiphase flows. Such an arrangement is particularly useful where the multiphase flows are located in geographically disparate locations where, for example, local monitoring of each multiphase flow may be impractical or prohibitively expensive. In view of the foregoing, it will be appreciated that embodiments of the present invention are well suited for use in conjunction with, among other things, multiphase flow monitoring and control systems.

At such time as one or more parameters have been calculated by MFC software 340, such calculated parameters may be stored in the memory of client computer 320 for further processing, analysis, and the like. Additionally, such calculated parameters may be displayed, in real time for example, at monitor 347 and/or at various other locations such as remote computers 349A, 349B, and the like.

Figure 6:
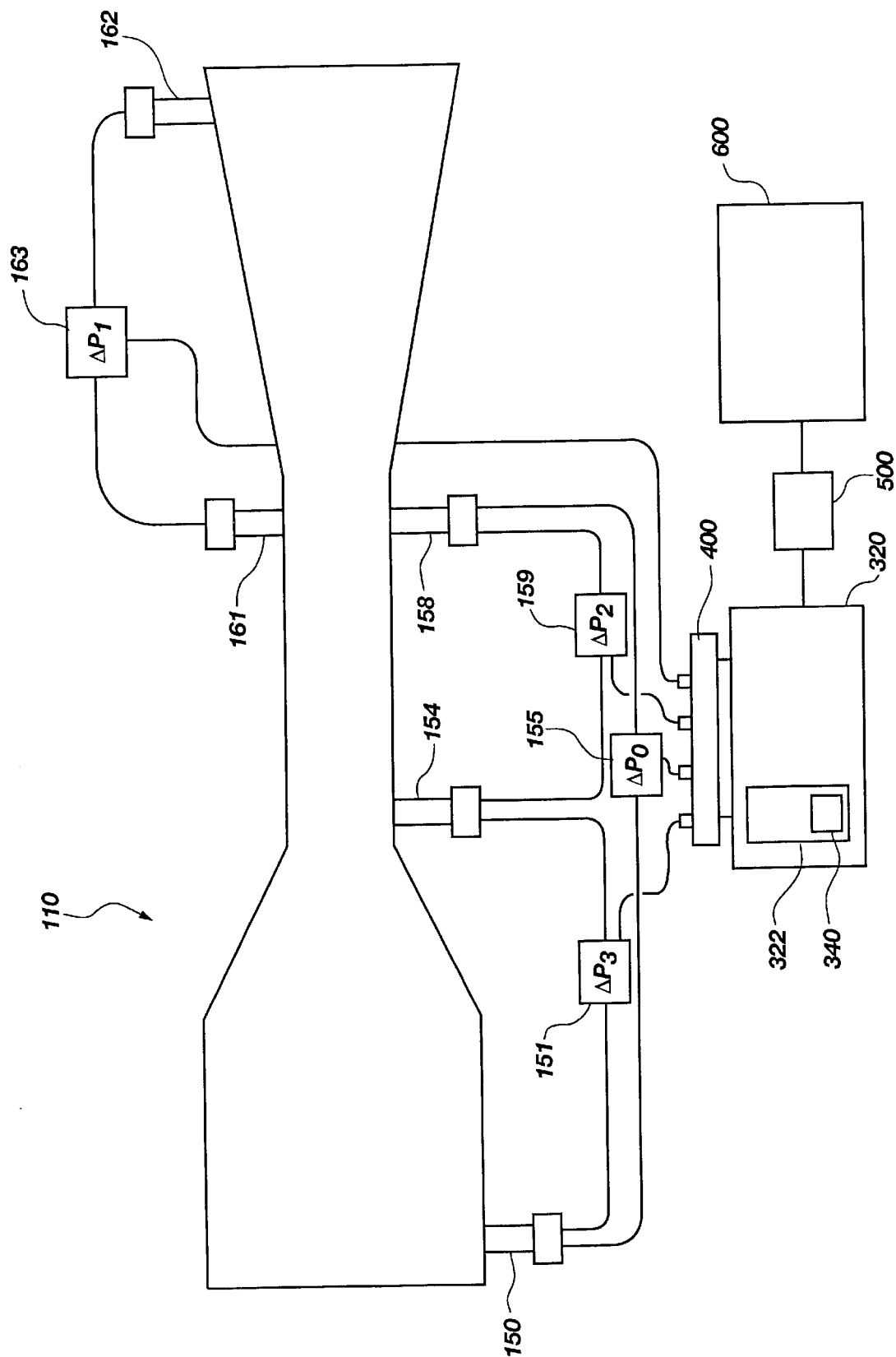
FIG. 6 is a schematic view which illustrates an exemplary application of an embodiment of multiphase flow calculation software.

As suggested earlier, embodiments of MFC software 340 may receive input from a variety of sources. In addition to processing various given values of selected parameters, MFC software 340 employs various differential pressure data concerning the multiphase fluid stream or flow whose liquid and gas phase mass flow rates are to be calculated or otherwise determined. One exemplary arrangement, wherein MFC software 340 receives input from a differential pressure flow meter 110, is indicated in FIG. 6. In the illustrated embodiment, client computer 320 is arranged for communication with pressure transducers 151, 155, 159, and 163, each of which is arranged so as to be subjected to pressure from at least two pressure measuring points of differential pressure flow meter 110. As a result of such arrangement, each pressure transducer senses a pressure differential between selected locations inside differential pressure flow meter 110.

In the exemplary arrangement illustrated in FIG. 6, pressure transducer 151, or other suitable component or device, senses a pressure differential between pressure measuring points 150 and 154, and communicates a corresponding signal to signal processor 400, which then generates a pressure differential value corresponding to the signal received from pressure transducer 151, or other suitable sensor, and communicates the generated pressure differential value to client computer 320. In like fashion, differential pressure data corresponding to pressure measuring point pairs 154 and 158, 150 and 158, and 158 and 162 are provided by pressure transducers 159, 155, and 163, respectively, to client computer 320. Preferably, the input provided to client computer 320 by differential pressure flowmeter 110 comprises measured pressure differential $\Delta P_3$ and measured pressure differential $\Delta P_2$. However, it will be appreciated that, as suggested in FIG. 6, additional or alternative data including, but not limited to, measured pressure differential $\Delta P_0$ and/or measured pressure differential $\Delta P_1$, may be supplied to client computer 320 to aid in the performance of liquid and gas phase mass flow rate calculations and/or any necessary intermediate calculations.

As briefly discussed earlier, not only are embodiments of the present invention effective in accurately calculating gas phase and liquid phase mass flow rates of multiphase flows, but the output generated by the various modules of MFC software 340 may be employed in a variety of different ways. With continuing reference to FIG. 6, various details are provided regarding an exemplary application for embodiments of MFC software 340.

As indicated in FIG. 6, embodiments of MFC software 340 may be usefully employed in conjunction with a control system 500 operably connected with an object system 600. In general, the liquid and gas phase mass flow data, and/or other data, produced by MFC software 340 is correlated with various predetermined instructions, preferably stored in system memory 322, which are then selectively transmitted to control system 500. Based upon the instructions, control system 500 then causes one or more characteristic responses or actions by object system 600. In this way, embodiments of MFC software 340 are useful in facilitating, among other things, real-time management and control capabilities with respect to object system 600. Finally, note that such communication, transmission, and the like may be accomplished by way of hardwired connections, wireless connections, or combinations thereof.

It will be appreciated that object system 500 may be any device or system which is desired to be controlled and managed by MFC software 340. By way of example, one embodiment of object system 500 comprises one or more gas or oil wells, such as typically produce high void fraction multiphase flows. When the well begins to produce a multiphase flow which has an excessively high liquid phase mass flow rate, for example, MFC software 340 determines the liquid phase mass flow rate and then causes client computer 320 to correlate the calculated liquid phase mass flow rate with one or more predetermined corresponding instructions. The instructions are then transmitted from client computer 320 to control system 500 which in turn, causes the well to respond in a manner corresponding to the instructions, such as by ceasing to produce the multiphase flow. Rather than simply causing the well to shut down, embodiments of MFC software 340 can also be used to cause, by way of control system 500, certain adjustments to the performance characteristics of the well. Finally, note that the foregoing is simply one exemplary application for embodiments of MFC software 340. Accordingly, the scope of the present invention should not be construed to be limited solely to such exemplary application.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. In a computer in communication with a differential pressure flow meter having at least three pressure measuring points, the first pressure measuring point being located at an entrance of the differential pressure flow meter, a second pressure measuring point being located at a proximal end of the extended throat, and a third pressure measuring point being located at a distal end of the extended throat, and the differential pressure flow meter further including an interior wall and having a contraction and an extended throat, a method for determining a flow rate of a liquid phase and a gas phase of a multiphase flow, the method comprising the steps for:

(a) determining a density $rho_{gw}$ of the gas phase of the multiphase flow;

(b) determining a normalized gas phase mass flow rate mgm;

(c) determining an actual gas phase mass flow rate $m_g$ based upon said normalized gas phase mass flow rate mgm and said density $rho_{gw}$;

(d) determining a gas phase velocity $u_g$ in the extended throat based upon said actual gas phase mass flow rate $m_g$;

(e) determining a pressure drop $\Delta P_{gl3}$ experienced by the gas phase in accelerating the liquid phase between the first and third pressure measuring points based upon said density $rho_{gw}$ and said estimated gas phase velocity $u_g$;

(f) determining a liquid phase velocity $u_l$ in the extended throat based upon a wall friction constant gcfw and said pressure drop $\Delta P_{gl3}$;

(g) determining friction between the liquid phase and the interior wall based upon said wall friction constant gcfw and said estimated liquid phase velocity $u_l$; and (h) determining a mass flow rate $m_t$ of the multiphase flow based upon said friction f and said estimated gas phase velocity $u_g$.

2. The method as recited in claim 1, further comprising the step of determining a mass flow rate $m_l$ of the liquid phase based upon said mass flow rate $m_t$ and said actual gas phase mass flow rate $m_g$.

3. The method as recited in claim 1, further comprising the step for determining a mass flow rate $m_l$ of the liquid phase using α measured void fraction a of the multiphase flow, a liquid phase density $rho_l$, a liquid phase velocity $u_l$, and a cross-sectional area $A_{pipe}$ of a conduit wherein said void fraction is measured.

4. The method as recited in claim 3, wherein said step for determining a mass flow rate $m_l$ of the liquid phase comprises an act of calculating said mass flow rate $m_l$ of the liquid phase using an equation:

$$m_l=(1-\alpha)\cdot rho_l u_l A_{pipe}.$$

5. The method as recited in claim 1, further comprising the step of retrievably storing, at the computer, results of at least one of steps (a) through (h).

6. The method as recited in claim 1, further comprising the step of transmitting results of at least one of steps (a) through (h) to a location remote from the computer.

7. The method as recited in claim 1, wherein said step for determining a density $rho_{gw}$ of the gas phase of the multiphase flow comprises an act of calculating said density $rho_{gw}$ of the gas phase of the multiphase flow using a reference gas density $rho_g$, a pressure P of the multiphase flow at the entrance of the differential pressure flow meter, and a temperature T of the multiphase flow at the entrance of the differential pressure flow meter.

8. The method as recited in claim 7, wherein said reference gas density $rho_g$ comprises a density of natural gas at standard temperature and pressure.

9. The method as recited in claim 1, wherein said step for determining a normalized gas phase mass flow rate mgm comprises an act of calculating said normalized gas phase mass flow rate mgm using experimentally determined constants A, B, and C, a measured pressure differential $\Delta P_3$ across the contraction, and a measured pressure differential $\Delta P_2$ across the extended throat.

10. The method as recited in claim 1, wherein said step for determining an actual gas phase mass flow rate $m_g$ comprises an act of calculating said actual gas phase mass flow rate $m_g$ using said normalized gas mass flow rate mgm, an area $A_t$ of the extended throat, a contraction ratio β, and said density $rho_{gw}$ of the gas phase.

11. The method as recited in claim 1, wherein said step for determining a gas phase velocity $u_g$ in the extended throat comprises an act of calculating said gas phase velocity $u_g$ in the extended throat using said actual gas phase mass flow rate $m_g$, said reference gas density $rho_g$, and said area $A_t$ of the extended throat.

12. The method as recited in claim 1, wherein said step for determining a pressure drop $\Delta P_{gl3}$ experienced by the gas phase in accelerating the liquid phase between the first and third pressure measuring points comprises an act of calculating said pressure drop $\Delta P_{gl3}$ using a measured pressure differential $\Delta P_3$ across the contraction, said gas phase density $rho_{gw}$, said gas phase velocity $u_g$ in the extended throat, and a contraction ratio β.

13. The method as recited in claim 1, wherein said step for determining a liquid phase velocity $u_l$ in the extended throat comprises an act of estimating said liquid phase velocity $u_l$ in the extended throat using a measured pressure differential $\Delta P_3$ across the contraction, said pressure drop $\Delta P_{gl3}$, a density $rho_l$ of the liquid phase, a wall friction constant gcfw, and a contraction ratio β.

14. The method as recited in claim 1, wherein said step for determining friction f between the liquid phase and the interior wall comprises an act of calculating said friction f between the interior wall and the liquid phase using said wall friction constant gcfw, a density $rho_l$ of the liquid phase, and said liquid phase velocity $u_l$ in the extended throat.

15. The method as recited in claim 1, wherein said step for determining a mass flow rate $m_t$ of the multiphase flow comprises an act of calculating said mass flow rate $m_t$ of the multiphase flow using a measured pressure differential $\Delta P_3$ across the contraction, a contraction ratio β, said estimated gas phase velocity $u_g$ in the extended throat, an area $A_t$, and said friction f.

16. In a computer in communication with a differential pressure flow meter having at least three pressure measuring points, the first pressure measuring point being located at an entrance of the differential pressure flow meter, a second pressure measuring point being located at a proximal end of the extended throat, and a third pressure measuring point being located at a distal end of the extended throat, and the differential pressure flow meter further including an interior wall and having a contraction and an extended throat, a method for determining a flow rate of a liquid phase and a gas phase of a multiphase flow, the method comprising the acts of:

(a) calculating a density $rho_{gw}$ of the gas phase of the multiphase flow using a reference gas density $rho_g$, a pressure P of the multiphase flow at the entrance of the differential pressure flow meter, and a temperature T of the multiphase flow at the entrance of the differential pressure flow meter;

(b) calculating a normalized gas phase mass flow rate mgm using experimentally determined constants A, B, and C, a measured pressure differential $\Delta P_3$ across the contraction, and a measured pressure differential $\Delta P_2$ across the extended throat;

(c) calculating an actual gas phase mass flow rate $m_g$ using said normalized gas mass flow rate mgm, an area $A_t$ of the extended throat in square inches, a contraction ratio β, and said density $rho_{gw}$ of the gas phase;

(d) estimating a gas phase velocity $u_g$ in the extended throat using said actual gas phase mass flow rate $m_g$, said reference gas density $rho_g$, and said area $A_t$ of the extended throat;

(e) calculating a pressure drop $\Delta P_{g/3}$ experienced by the gas phase in accelerating the liquid phase between the first and third pressure measuring points, using said measured pressure differential $\Delta P_3$ across the contraction, said gas phase density $rho_{gw}$, said estimated gas phase velocity $u_g$ in the extended throat, and said contraction ratio $\beta$;

(f) estimating a liquid phase velocity $u_l$ in the extended throat using said measured pressure differential $\Delta P_3$ across the contraction, said pressure drop $\Delta P_{g/3}$, a density $rho_l$ of the liquid phase, a wall friction constant gcfw, and said contraction ratio $\beta$;

(g) calculating friction f between the interior wall and the liquid phase using said wall friction constant gcfw, said density $rho_l$ of the liquid phase, and said estimated liquid phase velocity $u_l$ in the extended throat; and (h) calculating the mass flow rate $m_t$ of the multiphase flow using said measured pressure differential $\Delta P_3$ across the contraction, said contraction ratio $\beta$, said estimated gas phase velocity $u_g$ in the extended throat, said area $A_t$, and said friction f.

17. The method as recited in claim 16, further comprising the act of calculating a mass flow rate $m_l$ of the liquid phase using a measured void fraction $\alpha$ of the multiphase flow, a liquid phase density $rho_l$, a liquid phase velocity $u_l$, and a cross-sectional area $A_{pipe}$ of a conduit wherein said void fraction is measured.

18. The method as recited in claim 17, wherein said act of calculating said mass flow rate $m_l$ of the liquid phase is performed using an equation:

$$m_l = (1-\alpha) \cdot rho_l \cdot u_l \cdot A_{pipe}.$$

19. The method as recited in claim 16, wherein said act of calculating said density $rho_{gw}$ of the gas phase of the multiphase flow is accomplished using an equation:

$$rho_{gw} = rho_g \left( \frac{P + 14.7}{14.7} \right)\left( \frac{60 + 459.67}{T + 459.67} \right).$$

20. The method as recited in claim 16, wherein said act of calculating said normalized gas phase mass flow rate mgm is accomplished using an equation:

$$mgm = A + B\sqrt{\Delta P_3} + C\sqrt{\Delta P_2}.$$

21. The method as recited in claim 16, wherein said act of calculating said actual gas phase mass flow rate $m_g$ is accomplished using an equation:

$$m_g = mgm \cdot A_t \cdot \frac{\sqrt{rho_{gw}}}{\sqrt{1-\beta^4}}.$$

22. The method as recited in claim 16, wherein said act of estimating said gas phase velocity $u_g$ in the extended throat is accomplished using an equation:

$$u_g = \frac{m_g}{rho_g \cdot A_t}.$$

23. The method as recited in claim 16, wherein said act of calculating said pressure drop $\Delta P_{g/3}$ experienced by the gas phase in accelerating the liquid phase between the first and third pressure measuring points is accomplished using an equation:

$$\Delta P_{g/3} = \Delta P_3 - \frac{1}{2} \cdot rho_{gw} \cdot u_g^2 \cdot (1-\beta^4).$$

24. The method as recited in claim 16, wherein said act of estimating said liquid phase velocity $u_l$ in the extended throat is accomplished using an equation:

$$u_1 = \sqrt{\frac{2(\Delta P_3 - \Delta P_{g/3})}{rho_1 \cdot [(1+\beta^4) + gcfw]}}.$$

25. The method as recited in claim 16, wherein said act of calculating said friction f between the interior wall and the liquid phase is accomplished using an equation:

$$f = gcfw \cdot \frac{1}{2} \cdot rho_1 \cdot uu_1^2.$$

26. The method as recited in claim 16, wherein said act of calculating said mass flow rate $m_t$ of the multiphase flow is accomplished using an equation:

$$m_t = \frac{2(\Delta P_3 - f)}{(1-\beta^4) \cdot u_g} \cdot A_t.$$

27. In a computer in communication with a differential pressure flow meter having at least three pressure measuring points, the first pressure measuring point being located at an entrance of the differential pressure flow meter, a second pressure measuring point being located at a proximal end of the extended throat, and a third pressure measuring point being located at a distal end of the extended throat, and the differential pressure flow meter further including an interior wall and having a contraction and an extended throat, a computer program product for implementing a method for determining a flow rate of a liquid phase and a gas phase of a multiphase flow, the computer program product comprising:

a computer readable medium carrying computer executable instructions for performing the method, wherein the method comprises the steps for:

(a) determining a density $rho_{gw}$ of the gas phase of the multiphase flow;

(b) determining a normalized gas phase mass flow rate mgm;

(c) determining an actual gas phase mass flow rate $m_g$ based upon said normalized gas phase mass flow rate mgm and said density $rho_{gw}$;

(d) determining a gas phase velocity $u_g$ in the extended throat based upon said actual gas phase mass flow rate $m_g$;

(e) determining a pressure drop $\Delta P_{g/3}$ experienced by the gas phase in accelerating the liquid phase between the first and third pressure measuring points based upon said density $rho_{gw}$ and said estimated gas phase velocity $u_g$;

(f) determining a liquid phase velocity $u_l$ in the extended throat based upon a wall friction constant gcfw and said pressure drop $\Delta P_{g/3}$;

(g) determining friction between the liquid phase and the interior wall based upon said wall friction constant gcfw and said estimated liquid phase velocity $u_l$; and (h) determining a mass flow rate $m_t$ of the multiphase flow based upon said friction f and said estimated gas phase velocity $u_g$.

28. The computer program product as recited in claim 27, further comprising the step for determining a mass flow rate $m_l$ of the liquid phase based upon a measured void fraction $\alpha$ of the multiphase flow, a liquid phase density $rho_l$, a liquid phase velocity $u_l$, and a cross-sectional area $A_{pipe}$ of a conduit wherein said void fraction is measured.

29. The computer program product as recited in claim 28, wherein said step for determining a mass flow rate $m_l$ of the liquid phase comprises an act of calculating said mass flow rate $m_l$ of the liquid phase using an equation:

$$m_l = (1-\alpha) \cdot rho_l u_l A_{pipe}.$$

30. The computer program product as recited in claim 27, wherein said step for determining a density $rho_{gw}$ of the gas phase of the multiphase flow comprises an act of calculating said density $rho_{gw}$ of the gas phase of the multiphase flow using a reference gas density $rho_g$, a pressure P of the multiphase flow upstream of the differential pressure flow meter, and a temperature T of the multiphase flow upstream of the differential pressure flow meter.

31. The computer program product as recited in claim 27, wherein said step for determining a normalized gas phase mass flow rate mgm comprises an act of calculating said normalized gas phase mass flow rate mgm using experimentally determined constants A, B, and C, a measured pressure differential $\Delta P_3$ across the contraction, and a measured pressure differential $\Delta P_2$ across the extended throat.

32. The computer program product as recited in claim 27, wherein said step for determining an actual gas phase mass flow rate $m_g$ comprises an act of calculating said actual gas phase mass flow rate $m_g$ using said normalized gas mass flow rate mgm, an area $A_t$ of the extended throat, a contraction ratio $\beta$, and said density $rho_{gw}$ of the gas phase.

33. The computer program product as recited in claim 27, wherein said step for determining a gas phase velocity $u_g$ in the extended throat comprises an act of estimating a gas phase velocity $u_g$ in the extended throat using said actual gas phase mass flow rate $m_g$, a reference gas density $rho_g$, and an area $A_t$ of the extended throat.

34. The computer program product as recited in claim 27, wherein said step for determining a pressure drop $\Delta P_{gl3}$ experienced by the gas phase in accelerating the liquid phase between the first and third pressure measuring points comprises an act of calculating said pressure drop $\Delta P_{gl3}$ using a measured pressure differential $\Delta P_3$ across the contraction, said gas phase density $rho_{gw}$, said estimated gas phase velocity $u_g$ in the extended throat, and a contraction ratio $\beta$.

35. The computer program product as recited in claim 27, wherein said step for determining a liquid phase velocity $u_l$ in the extended throat comprises an act of estimating a liquid phase velocity $u_l$ in the extended throat using a measured pressure differential $\Delta P_3$ across the contraction, said pressure drop $\Delta P_{gl3}$, a density $rho_l$ of the liquid phase, a wall friction constant gcfw, and a contraction ratio $\beta$.

36. The computer program product as recited in claim 27, wherein said step for determining friction f between the liquid phase and the interior wall comprises an act of calculating friction f between the interior wall and the liquid phase using said wall friction constant gcfw, a density $rho_l$ of the liquid phase, and said estimated liquid phase velocity $u_l$ in the extended throat.

37. The computer program product as recited in claim 27, wherein said step for determining a mass flow rate $m_t$ of the multiphase flow comprises an act of calculating said mass flow rate $m_t$ of the multiphase flow using a measured pressure differential $\Delta P_3$ across the contraction, a contraction ratio $\beta$, said estimated gas phase velocity $u_g$ in the extended throat, an area $A_t$, and said friction f.

38. In a computer operatively connected to a differential pressure flow meter including an interior wall and having a contraction and an extended throat, and wherein a first pressure measuring point is located upstream of the differential pressure flow meter, a second pressure measuring point is located at a proximal end of the extended throat, and a third pressure measuring point is located at a distal end of the extended throat, a computer program product for implementing a method for determining a flow rate of a liquid phase and a gas phase of a multiphase flow, the computer program product comprising:

a computer readable medium carrying computer executable instructions for performing the method, wherein the method comprises the acts of:
(a) calculating a density $rho_{gw}$ of the gas phase of the multiphase flow using a reference gas density $rho_g$, a pressure P of the multiphase flow at the entrance of the differential pressure flow meter, and a temperature T of the multiphase flow at the entrance of the differential pressure flow meter;
(b) calculating a normalized gas phase mass flow rate mgm using experimentally determined constants A, B, and C, a measured pressure differential $\Delta P_3$ across the contraction, and a measured pressure differential $\Delta P_2$ across the extended throat;
(c) calculating an actual gas phase mass flow rate $m_g$ using said normalized gas mass flow rate mgm, an area $A_t$ of the extended throat in square inches, a contraction ratio $\beta$ of said extended throat area $A_t$ to the entrance area $A_0$, and said density $rho_{gw}$ of the gas phase;
(d) estimating a gas phase velocity $u_g$ in the extended throat using said actual gas phase mass flow rate $m_g$, said reference gas density $rho_g$, and said area $A_t$ of the extended throat;
(e) calculating a pressure drop $\Delta P_{gl3}$ experienced by the gas phase in accelerating the liquid phase between the first and third pressure measuring points, using said measured pressure differential $\Delta P_3$ across the contraction, said gas phase density $rho_{gw}$, said estimated gas phase velocity $u_g$ in the extended throat, and said contraction ratio $\beta$;
(f) estimating a liquid phase velocity $u_l$ in the extended throat using said measured pressure differential $\Delta P_3$ across the contraction, said pressure drop $\Delta P_{gl3}$, a density $rho_l$ of the liquid phase, a wall friction constant gcfw, and said contraction ratio $\beta$;
(g) calculating friction f between the interior wall and the liquid phase using said wall friction constant gcfw, said density $rho_l$ of the liquid phase, and said estimated liquid phase velocity $u_l$ in the extended throat; and
(h) calculating the mass flow rate $m_t$ of the multiphase flow using said measured pressure differential $\Delta P_3$ across the contraction, said contraction ratio $\beta$, said estimated gas phase velocity $u_g$ in the extended throat, said area $A_t$, and said friction f.

39. The computer program product as recited in claim 38, further comprising the act of calculating a mass flow rate $m_l$ of the liquid phase using a measured void fraction $\alpha$ of the multiphase flow, a liquid phase density $rho_l$, a liquid phase velocity $u_l$, and a cross-sectional area $A_{pipe}$ of a conduit wherein said void fraction is measured.

40. The computer program product as recited in claim 39, wherein said act of calculating said mass flow rate $m_l$ of the liquid phase is performed using an equation:

$$m_l = (1-\alpha) \cdot rho_l u_l A_{pipe}.$$

41. The computer program product as recited in claim 38, wherein said act of calculating said density $rho_{gw}$ of the gas phase of the multiphase flow is accomplished using an equation:

$$rho_{gw} = rho_g \left(\frac{P+14.7}{14.7}\right)\left(\frac{60+459.67}{T+459.67}\right).$$

42. The computer program product as recited in claim 38, wherein said act of calculating said normalized gas phase mass flow rate mgm is accomplished using an equation:

$$mgm = A + B\sqrt{\Delta}P_3 + C\sqrt{\Delta}P_2.$$

43. The computer program product as recited in claim 38, wherein said act of calculating said actual gas phase mass flow rate $m_g$ is accomplished using an equation:

$$m_g = mgm \cdot A_t \cdot \frac{\sqrt{rho_{gw}}}{\sqrt{1-\beta^4}}.$$

44. The computer program product as recited in claim 38, wherein said act of estimating said gas phase velocity $u_g$ in the extended throat is accomplished using an equation:

$$u_g = \frac{m_g}{rho_g \cdot A_t}.$$

45. The computer program product as recited in claim 38, wherein said act of calculating said pressure drop $\Delta P_{g/3}$ experienced by the gas phase in accelerating the liquid phase between the first and third pressure measuring points is accomplished using an equation:

$$\Delta P_{g/3} = -\Delta P_3 - \frac{1}{2} \cdot rho_{gw} \cdot u_g^2 \cdot (1-\beta^4).$$

46. The computer program product as recited in claim 38, wherein said act of estimating said liquid phase velocity $u_l$ in the extended throat is accomplished using an equation:

$$u_1 = \sqrt{\frac{2(\Delta P_3 - \Delta P_{g/3})}{rho_1 \cdot [(1+\beta^4) + gcfw]}}.$$

47. The computer program product as recited in claim 38, wherein said act of calculating said friction f between the interior wall and the liquid phase is accomplished using an equation:

$$f = gcfw \cdot \frac{1}{2} \cdot rho_1 \cdot uu_1^2.$$

48. The computer program product as recited in claim 38, wherein said act of calculating said mass flow rate $m_t$ of the multiphase flow is accomplished using an equation:

$$m_t = \frac{2(\Delta P_3 - f)}{(1-\beta^4) \cdot u_g} \cdot A_t.$$

49. In a computer operatively connected to a differential pressure flow meter including an interior wall and having a contraction and an extended throat, and wherein a first pressure measuring point is located upstream of the differential pressure flow meter, a second pressure measuring point is located at a proximal end of the extended throat, and a third pressure measuring point is located at a distal end of the extended throat, a method for determining a flow rate of a liquid phase and a gas phase of a multiphase flow originating from a well, the method comprising the acts of:

(a) calculating a density $rho_{gw}$ of the gas phase of the multiphase flow using the equation:

$$rho_{gw} = rho_g \left(\frac{P+14.7}{14.7}\right)\left(\frac{60+459.67}{T+459.67}\right)$$

wherein, $rho_g$ is methane density at standard temperature and pressure for a specific well;

P is a pressure of the multiphase flow at the entrance of the multiphase flow meter; and T is a temperature of the multiphase flow at the entrance of the multiphase flow meter;

(b) calculating a normalized gas phase mass flow rate mgm using the equation:

$$mgm = A + B\sqrt{\Delta}P_3 + C\sqrt{\Delta}P_2$$

wherein,

A, B, and C are experimentally determined constants required to calculate gas phase mass flow rate;

$\Delta P_3$ is a measured pressure differential across the contraction; and $\Delta P_2$ is a measured pressure differential across the extended throat;

(c) calculating an actual gas phase mass flow rate $m_g$ using the equation:

$$m_g = mgm \cdot A_t \cdot \frac{\sqrt{rho_{gw}}}{\sqrt{1-\beta^4}}$$

wherein, mgm is the normalized gas phase mass flow rate;

$A_t$ is an area of the extended throat; and $\beta$ is a contraction ratio of $A_t$ to the entrance area $A_0$;

(d) estimating a gas phase velocity $u_g$ in the extended throat using the equation:

$$u_g = \frac{m_g}{rho_g \cdot A_t}$$

wherein, $m_g$ is the gas phase mass flow rate;

$rho_g$ is a gas phase density for a specific well; and $A_t$ is an area of the extended throat;

(e) calculating a pressure drop $\Delta P_{g/3}$ experienced by the gas phase in accelerating the liquid phase between the first and third pressure measuring points, using the equation:

$$\Delta P_{g/3} = -\Delta P_3 - \frac{1}{2} \cdot rho_{gw} \cdot u_g^2 \cdot (1-\beta^4)$$

wherein, $\Delta P_3$ is a measured pressure differential across the contraction;

$rho_{gw}$ is the gas phase density at the well;

$u_g$ is the gas phase velocity in the extended throat; and
β is a contraction ratio of $A_t$ to the entrance area $A_0$;

(f) estimating a liquid phase velocity $u_l$ in the extended throat using the equation:

$$u_l = \sqrt{\frac{2(\Delta P_3 - \Delta P_{gl3})}{rho_l \cdot [(1+\beta^4) + gcfw]}}$$

wherein,
$\Delta P_3$ is a measured pressure differential across the contraction;
$\Delta P_{gl3}$ is the pressure drop experienced by the gas phase due to work performed by the gas phase on the liquid phase;
$rho_l$ is the liquid phase density; and
gcfw is a wall friction constant;

(g) calculating friction f between the interior wall and the liquid phase using the equation:

$$f = gcfw \cdot \frac{1}{2} \cdot rho_l \cdot uu_1^2$$

wherein,
gcfw is a wall friction constant;
$rho_l$ is the liquid phase density; and
$u_l$ is the estimated liquid phase velocity in the extended throat; and (h) calculating the mass flow rate $m_t$ of the multiphase flow using the equation:

$$m_t = \frac{2(\Delta P_3 - f)}{(1 - \beta^4) \cdot u_g} \cdot A_t$$

wherein,
$\Delta P_3$ is a measured pressure differential across the contraction;
β is a contraction ratio of $A_t$ to the entrance area $A_0$; and
$u_g$ is the estimated gas phase velocity in the extended throat.

50. In a computer operatively connected to a differential pressure flow meter including an interior wall and having a contraction and an extended throat, and wherein a first pressure measuring point is located upstream of the differential pressure flow meter, a second pressure measuring point is located at a proximal end of the extended throat, and a third pressure measuring point is located at a distal end of the extended throat, a method for determining a flow rate of a liquid phase and a gas phase of a multiphase flow originating from a well, the method comprising the acts of:

(a) calculating a density $rho_{gw}$ of the gas phase of the multiphase flow using the equation:

$$rho_{gw} = rho_g \left(\frac{P + 14.7}{14.7}\right)\left(\frac{60 + 459.67}{T + 459.67}\right)$$

wherein,
$rho_g$ is methane density at standard temperature and pressure for a specific well;
P is a pressure of the multiphase flow at the entrance of the multiphase flow meter; and
T is a temperature of the multiphase flow at the entrance of the multiphase flow meter;

(b) calculating a normalized gas phase mass flow rate mgm using the equation:

$$mgm = A + B\sqrt{\Delta P_3} + C\sqrt{\Delta P_2}$$

wherein,
A, B, and C are experimentally determined constants required to calculate gas phase mass flow rate;
$\Delta P_3$ is a measured pressure differential across the contraction; and
$\Delta P_2$ is a measured pressure differential across the extended throat;

(c) calculating an actual gas phase mass flow rate $m_g$ using the equation:

$$m_g = mgm \cdot A_t \cdot \frac{\sqrt{rho_{gw}}}{\sqrt{1 - \beta^4}}$$

wherein,
mgm is the normalized gas phase mass flow rate;
$A_t$ is an area of the extended throat; and
β is a contraction ratio of $A_t$ to the entrance area $A_0$;

(d) estimating a gas phase velocity $u_g$ in the extended throat using the equation:

$$u_g = \frac{m_g}{rho_g \cdot A_t}$$

wherein,
$m_g$ is the gas phase mass flow rate;
$rho_g$ is a gas phase density for a specific well; and
$A_t$ is an area of the extended throat;

(e) calculating a pressure drop $\Delta P_{gl3}$ experienced by the gas phase in accelerating the liquid phase between the first and third pressure measuring points, using the equation:

$$\Delta P_{gl3} = -\Delta P_3 - \frac{1}{2} \cdot rho_{gw} \cdot u_g^2 \cdot (1 - \beta^4)$$

wherein,
$\Delta P_3$ is a measured pressure differential across the contraction;
$rho_{gw}$ is the gas phase density at the well;
$u_g$ is the gas phase velocity in the extended throat; and
β is a contraction ratio of $A_t$ to the entrance area $A_0$;

(f) estimating a liquid phase velocity $u_l$ in the extended throat using the equation:

$$u_l = \sqrt{\frac{2(\Delta P_3 - \Delta P_{gl3})}{rho_l \cdot [(1+\beta^4) + gcfw]}}$$

wherein,
$\Delta P_3$ is a measured pressure differential across the contraction;
$\Delta P_{gl3}$ is the pressure drop experienced by the gas phase due to work performed by the gas phase on the liquid phase;
$rho_l$ is the liquid phase density; and
gcfw is a wall friction constant; and (g) calculating a mass flow rate $m_l$ of the liquid phase using an equation:

$$m_l = (1-\alpha) \cdot rho_l u_l A_{pipe}$$

wherein, $\alpha$ is a measured void fraction of the multiphase flow;
$rho_l$ is a liquid phase density;
$u_l$, is a liquid phase velocity; and
$A_{pipe}$ is a cross-sectional area of a conduit wherein said void fraction is measured.

51. The method as recited in claim 50, further comprising the act of calculating a multiphase mass flow rate $m_t$ by adding said mass flow rate $m_l$ of the liquid phase and said mass flow rate $m_g$ of the gas phase.

* * * * *